(12) United States Patent  (10) Patent No.: US 8,483,414 B2
Kondo et al.  (45) Date of Patent:  Jul. 9, 2013

(54) IMAGE DISPLAY DEVICE AND METHOD FOR DETERMINING AN AUDIO OUTPUT POSITION BASED ON A DISPLAYED IMAGE

(75) Inventors: Tetsujiro Kondo, Tokyo (JP); Yoshinori Watanabe, Kanagawa (JP); Naohide Yamada, Tokyo (JP)

(73) Assignee: Sony Corporation, Tokyo (JP)

( * ) Notice: Subject to any disclaimer, the term of this patent is extended or adjusted under 35 U.S.C. 154(b) by 1777 days.

(21) Appl. No.: 11/580,917

(22) Filed: Oct. 16, 2006

(65) Prior Publication Data

US 2007/0104341 A1  May 10, 2007

(30) Foreign Application Priority Data

Oct. 17, 2005  (JP) ................ 2005-301262

(51) Int. Cl.
*H04R 5/02* (2006.01)
*H04N 5/60* (2006.01)

(52) U.S. Cl.
USPC .......................................... 381/306; 348/738

(58) Field of Classification Search
USPC ................. 381/306, 333, 388; 348/500, 515, 348/738, 462, 483, 485, 481
See application file for complete search history.

(56) References Cited

U.S. PATENT DOCUMENTS

| 6,754,373 B1 * | 6/2004 | de Cuetos et al. ............ 382/118 |
| 6,829,018 B2 * | 12/2004 | Lin et al. ....................... 348/738 |
| 2006/0140420 A1 * | 6/2006 | Machida ....................... 381/116 |

FOREIGN PATENT DOCUMENTS

| JP | 4-104673 A | 4/1992 |
| JP | 8-125760 A | 5/1996 |
| JP | 9-233442 A | 9/1997 |
| JP | 11313272 A | * 11/1999 |
| JP | 2000-10756 | 1/2000 |
| JP | 2001-57699 A | 2/2001 |
| JP | 2003-264900 | 9/2003 |
| JP | 2004-120459 A | 4/2004 |
| JP | 2004187288 A | * 7/2004 |
| JP | 2005-12255 A | 1/2005 |

OTHER PUBLICATIONS

Japanese Office Action issued on May 24, 2011 in corresponding Japanese Application No. 2005-301262.
Japanese Office Action issued Apr. 17, 2012, in Patent Application No. 2005-301262.
Japanese Office Action issued Dec. 20, 2011, in Patent Application No. 2005-301262.

* cited by examiner

*Primary Examiner* — Duc Nguyen
*Assistant Examiner* — Kile Blair
(74) *Attorney, Agent, or Firm* — Oblon, Spivak, McClelland, Maier & Neustadt, L.L.P.

(57) ABSTRACT

An image display device for displaying images includes an image display unit for displaying images, an audio output unit for outputting audio from multiple positions corresponding to the images displayed by the image display unit, and an audio output position control unit for analyzing the images, controlling the audio output unit according to content of the images, and selecting the position from which to output audio.

17 Claims, 30 Drawing Sheets

BACKGROUND ART

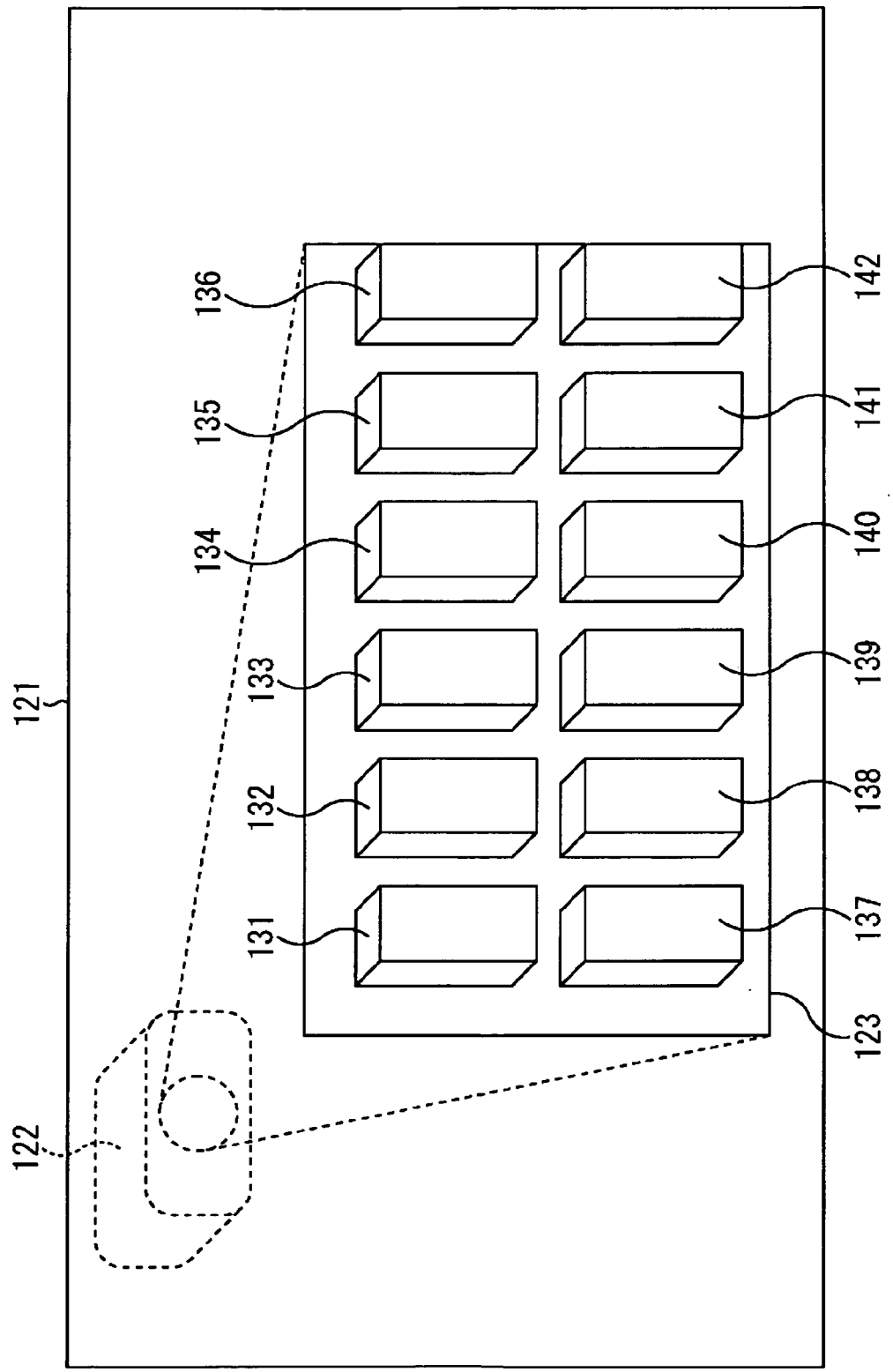

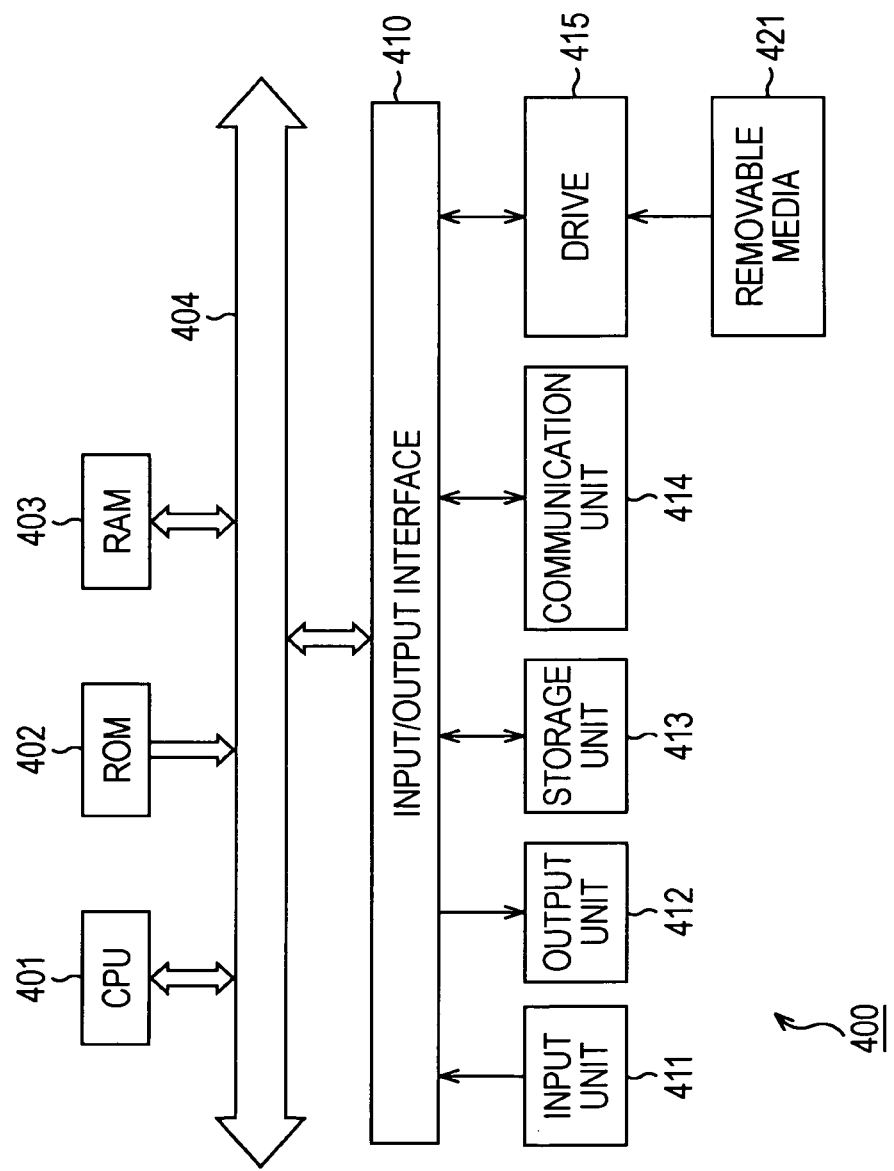

IMAGE DISPLAY DEVICE AND METHOD FOR DETERMINING AN AUDIO OUTPUT POSITION BASED ON A DISPLAYED IMAGE

CROSS REFERENCES TO RELATED APPLICATIONS

The present invention contains subject matter related to Japanese Patent Application JP 2005-301262 filed in the Japanese Patent Office on Oct. 17, 2005, the entire contents of which are incorporated herein by reference.

BACKGROUND OF THE INVENTION

1. Field of the Invention

The present invention relates to an image display device and method and program, and in particular, relates to an image display device and method and program whereby the audio of an image to be displayed can be output so as to heighten the sensation of reality.

2. Description of the Related Art

Heretofore, a television receiver receives a television signal which is broadcast from a broadcasting station, and displays images or outputs audio as a television broadcast program.

For example, in the case that the audio included in the television signal received by the television receiver 1 shown in FIG. 1 is of a monaural format, the same audio is output from both speakers 2A and 2B of the television receiver. Accordingly, for example, if any of persons 3A through 3C on the screen is talking, the speaker from which audio is output (speakers 2A or 2B) does not change. Further, in the case of monaural audio, the same audio is output from the left and right, and so the user who is viewing/listening hears the audio of persons 3A through 3C as the same, and the sensation of reality can be diminished.

Conversely, if the audio included in the signal received by the television receiver shown in FIG. 1 is in stereo, the audio generating direction (the direction of the audio generating location from the perspective of the user) of the persons 3A through 3C which the user can experience can be changed, due to the difference of audio volume of the left and right.

However, even with the case of such stereo, the speakers outputting the audio are speakers 2A and 2B and do not change, and so the direction of audio generation is difficult to change significantly, and so the sensation of reality can be diminished.

Also, generally on the side of the broadcast station, it cannot be estimated what kind of television receiver each viewer/listener will use to view/listen to the program. However, the viewing/listening environment of the user, such as the position relation of the left and right speakers, the features of the speakers, the position of the user, the placement location of the television receiver and so forth, differ for each user. Accordingly, depending on the viewing/listening environment of the user, the environment may differ greatly from the estimation of when the audio signal of a stereo format included in the television signal is generated, and so the user acquiring the sensation of reality attempted by the broadcast station side can be difficult.

In order to deal with this, a method has been considered wherein a sound can be obtained from a specified sound source to generate an acoustic signal, and an information signal can be generated and recorded from this acoustic signal, a moving image signal, and the position signal detecting unit, and by doing so, acoustic output corresponding to the display position of the image can be performed at the time of playback (for example, see Japanese Unexamined Patent Application Publication 2003-264900).

SUMMARY OF THE INVENTION

However, in this case, obtaining the sound in advance from the specified sound source and generating an information signal is necessary, but applying this to receiving and displaying general television broadcasting which has been used up to now and so forth is difficult.

The present invention has taken this situation into consideration, and provides an arrangement so as to output the audio corresponding to the displayed images with a greater sensation of reality.

According to one embodiment of the present invention, an image display device for displaying images is provided which has image display means for displaying an image, audio output means for outputting multiple audio corresponding to the image displayed with the image display means, and audio output position control means for analyzing the images, controlling the audio output means according to image content, and selecting a position to output the audio.

The audio output means may have multiple speakers, with the audio output position control means being arranged so as to control the audio output means to select the speaker to output the audio.

The audio output means may be capable of controlling an audio output position virtually by controlling output timing of the audio, with the audio output position control means controlling the output means and selecting the output timing, thus controlling a virtual position to output the audio.

The audio output position control means may have screen region dividing means for dividing a display screen of the image display means into predetermined multiple regions, difference average value calculating means for calculating an average value of the difference values of the luminance value between frames for each pixel having predetermined features wherein the pixel value thereof is determined in advance, for each region divided by the screen region dividing means, and audio output control means for controlling the audio output means and selecting the position for outputting the audio, based on the difference average value calculated with the difference average value calculating means.

The audio may be single-channel audio, or may be multiple-channel audio.

The audio output position control means may have difference average value calculating means for calculating a difference average value which is an average value of the difference values of the luminance value between frames for each pixel having predetermined features wherein the pixel value thereof is determined in advance, for each of the multiple regions assigned to the image, volume confirming means for confirming the volume of each of the multiple channels to specify the audio output positions, difference average value correcting means for correcting the difference average value calculated by the difference average value calculating means, based on the audio output positions having confirmed and specified the volume by the volume confirming means, region specifying means for specifying a region for outputting the audio, based on the difference average values corrected by the difference average value correcting means and audio output control means for controlling the audio output means so as to output the audio from the position corresponding to the region specified by the region specifying means.

The audio output position control means may have difference average value calculating means for calculating a difference average value which is an average value of the difference values of the luminance value between frames for each pixel having predetermined features wherein the pixel value thereof is determined in advance, for each of the multiple regions assigned to the image, region specifying means for specifying the region for the audio to be output, based on the difference average values calculated by the difference average value calculating means, volume adjusting means for determining adjustment amount of the volume of the audio output from the audio output means, based on the region for audio output specified by the region specifying means, volume confirming means for confirming the volume of each of the multiple channels to specify the audio output positions, comparing means for comparing the region for audio output specified by the region specifying means and the audio output positions wherein the volume is confirmed and specified by the volume confirming means, adjustment amount correcting means for correcting the amount of adjustment for audio volume determined by the volume adjusting means, based on the comparison results by the comparing means, and audio output control means for controlling the audio output means so as to adjust the audio volume based on the volume adjustment amount corrected by the adjustment amount correcting means.

The image display device may have user position corresponding processing means for detecting the position of the user viewing/listening to the image and audio, and controlling delay amount of the audio output timing by the audio output means, according to the position of the user.

The audio output means may have multiple detachable speakers, with the image display device further having region setting means for setting the regions to be divided by the screen region dividing means, according to the positions of the speakers connected thereto.

According to another embodiment of the present invention, there is provided an image display method for displaying an image on an image display device, including the steps of displaying an image, analyzing the image to be displayed, and selecting the position of audio output corresponding to the image, according to the image content, and outputting the audio from the selected positions.

According to another embodiment of the present invention, there is provided a program for a computer to execute processing for displaying an image, including the steps of displaying an image, analyzing the image to be displayed, and selecting the position of audio output corresponding to the image, according to the image content; and outputting the audio from the selected positions.

According to another embodiment of the present invention, there is provided and image display device for displaying images, which has an image display unit for displaying images, an audio output unit for outputting audio from multiple positions corresponding to the images displayed with the image display unit, and an audio output position control unit for analyzing the images, controlling the audio output unit according to content of the images, and selecting the position from which to output audio.

Thus, with an embodiment of the present invention, an image is displayed, the displayed image is analyzed, the position of audio output corresponding to the image is selected according to the image content, and audio is output from the selected position.

Also, with an embodiment of the present invention, audio can be output while images are displayed. In particular, the audio corresponding to the displayed images can be output so as to heighten the sensation of reality.

BRIEF DESCRIPTION OF THE DRAWINGS

FIG. 11 is a diagram illustrating a configuration example of a projection system to which an embodiment of the present invention has been applied;

FIG. 30 is a diagram illustrating a configuration example of a personal computer to which an embodiment of the present invention has been applied.

DESCRIPTION OF THE PREFERRED EMBODIMENTS

Figure 1:
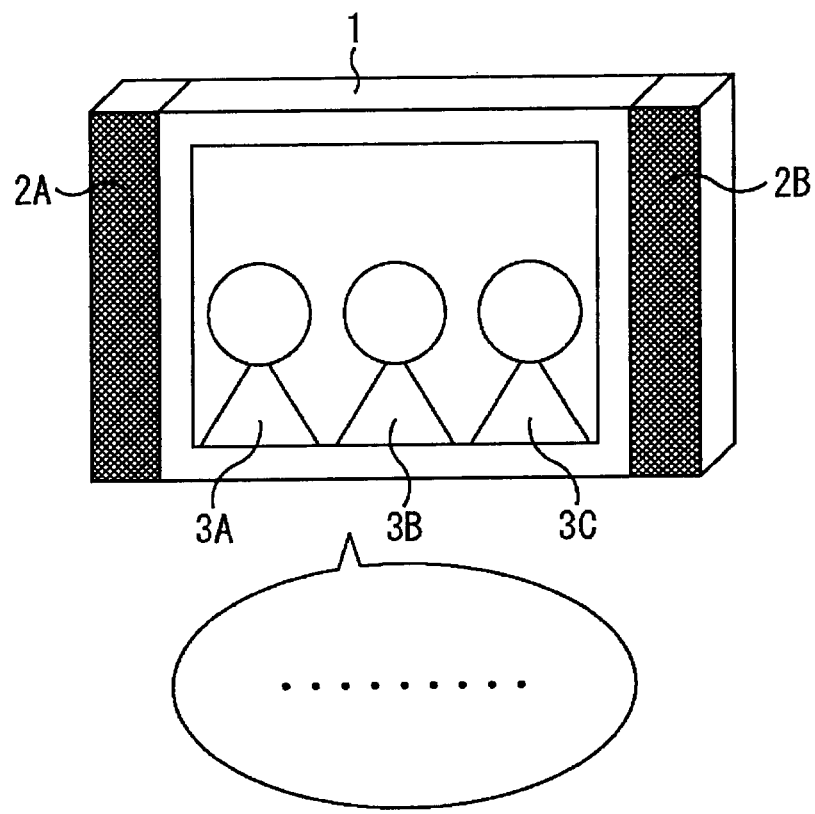
FIG. 1 is a perspective view illustrating a television receiving device used heretofore.

Before describing an embodiment of the present invention, the correspondence between the features of the claims and the specific elements disclosed below in an embodiment of the present invention is discussed below. This description is intended to assure that an embodiment supporting the claimed invention is described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiment are described in the claims. That is, the description does not deny the existence of aspects of the present invention that are described in the embodiment but not claimed in the invention of this application, i.e., the existence of aspects of the present invention that in future may be claimed by a divisional application, or that may be additionally claimed through amendments.

The image display device (for example, a display device in FIG. 2) according to an embodiment of the present invention includes image display means (for example, an display unit in FIG. 3) for displaying an image, audio output means (for example, an audio output unit in FIG. 3) for outputting audio corresponding to the images displayed with the image display means from multiple locations, and audio output position control means (for example, an audio output position control unit in FIG. 3) for analyzing the images, controlling the audio output means according to image content, and selecting the positions from which to output the audio.

The audio output means may be arranged so as to have multiple speakers (for example, the speakers in FIG. 2), and the audio output position control means control the audio output means to select the speaker from which to output the audio.

The audio output means may be arranged so as to control the audio output position virtually by controlling the audio output timing, and the audio output position control means to control a virtual position (for example, step S133 in FIG. 21) from which to output the audio by controlling the audio output means and selecting the output timing.

The audio output position control means may be arranged so as to have screen region dividing means (for example, a screen region dividing unit in FIG. 4) for dividing a display screen of the image display means into predetermined multiple regions, difference average value calculating means (for example, a difference average value calculating unit in FIG. 4) for calculating an average value of the difference values of the luminance value between frames for each pixel having predetermined features wherein the pixel value thereof is determined in advance, for each region divided by the screen region dividing means, and audio output control means (for example, an audio output control unit in FIG. 4) for controlling the audio output means and selecting the position for outputting the audio, based on the difference average value calculated with the difference average value calculating means.

Figure 4:
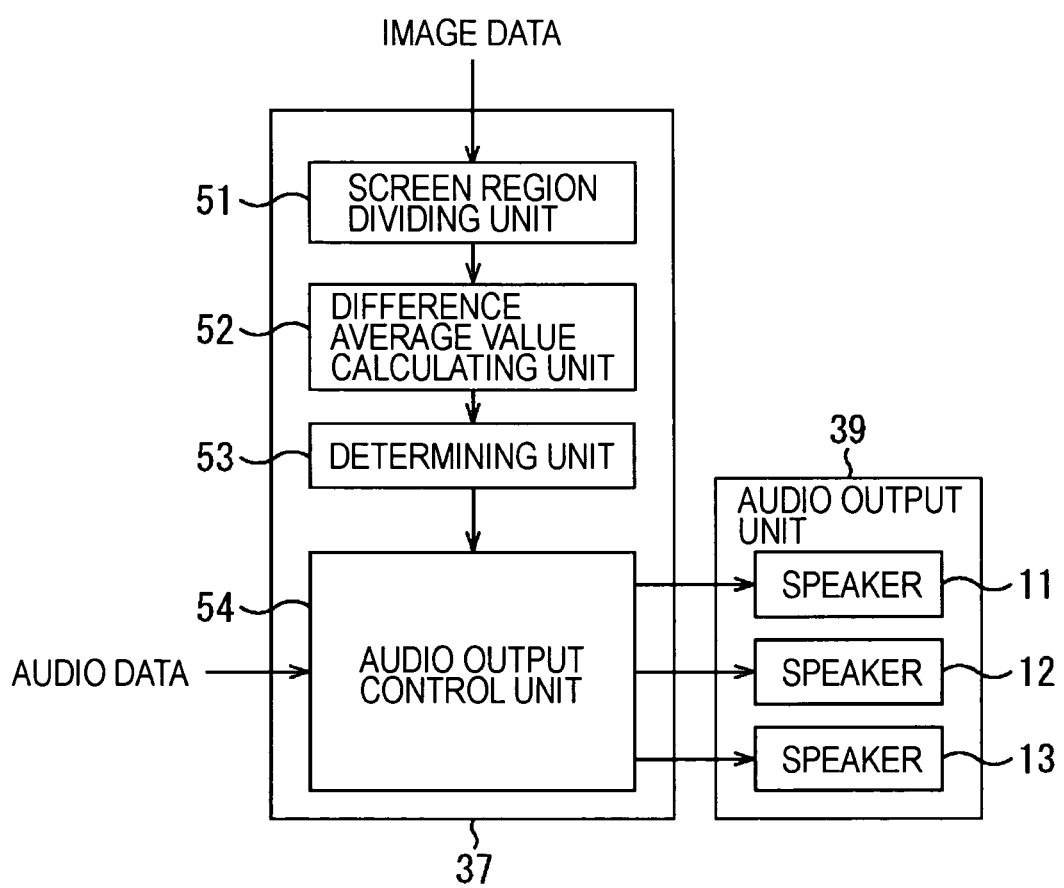
FIG. 4 is a block diagram illustrating a detailed configuration example of an audio output position control unit in FIG. 3.

An arrangement may be made wherein the audio is single-channel audio (for example, the audio data in FIG. 4). An arrangement may be made wherein the audio is multiple-channel audio (for example, the audio data in FIG. 15).

The audio output position control means may be arranged so as to have difference average value calculating means (for example, a difference average value calculating unit in FIG. 4) for calculating a difference average value which is an average value of the difference values of the luminance value between frames for each pixel having predetermined features wherein the pixel value thereof is determined in advance, for each of the multiple regions assigned to the image, volume confirming means (for example, an audio confirming unit in FIG. 15) for confirming the volume of each of the multiple channels to specify the audio output positions, difference average value correcting means (for example, a difference average value correcting unit in FIG. 15) for correcting the difference average value calculated by the difference average value calculating means, based on the audio output positions having confirmed and specified the volume by the volume confirming means, region specifying means (for example, a region specifying unit in FIG. 15) for specifying a region for outputting the audio, based on the difference average values corrected by the difference average value correcting means, and audio output control means (for example, an output control unit in FIG. 15) for controlling the audio output means so as to output the audio from the position corresponding to the region specified by the region specifying means.

An arrangement may be made wherein the audio output position control means has difference average value calculating means (for example, a difference average value calculating unit in FIG. 4) for calculating a difference average value which is an average value of the difference values of the luminance value between frames for each pixel having predetermined features wherein the pixel value thereof is determined in advance, for each of the multiple regions assigned to the image, region specifying means (for example, a region specifying means in FIG. 17) for specifying the region for the audio to be output, based on the difference average values calculated by the difference average value calculating means, volume adjusting means (for example, a volume adjusting unit in FIG. 17) for determining adjustment amount of the volume of the audio output from the audio output means, based on the region for audio output specified by the region specifying means, volume confirming means (for example, a volume confirming unit in FIG. 17) for confirming the volume of each of the multiple channels to specify the audio output positions, comparing means (for example, a comparing unit in FIG. 17) for comparing the region for audio output specified by the region specifying means and the audio output positions wherein the volume is confirmed and specified by the volume confirming means, adjustment amount correcting means (for example, an adjustment amount correcting unit in FIG. 17) for correcting the amount of adjustment for audio volume determined by the volume adjusting means, based on the comparison results by the comparing means, and audio output control means (for example, an output control unit) for controlling the audio output means so as to adjust the audio volume based on the volume adjustment amount corrected by the adjustment amount correcting means.

Figure 19:
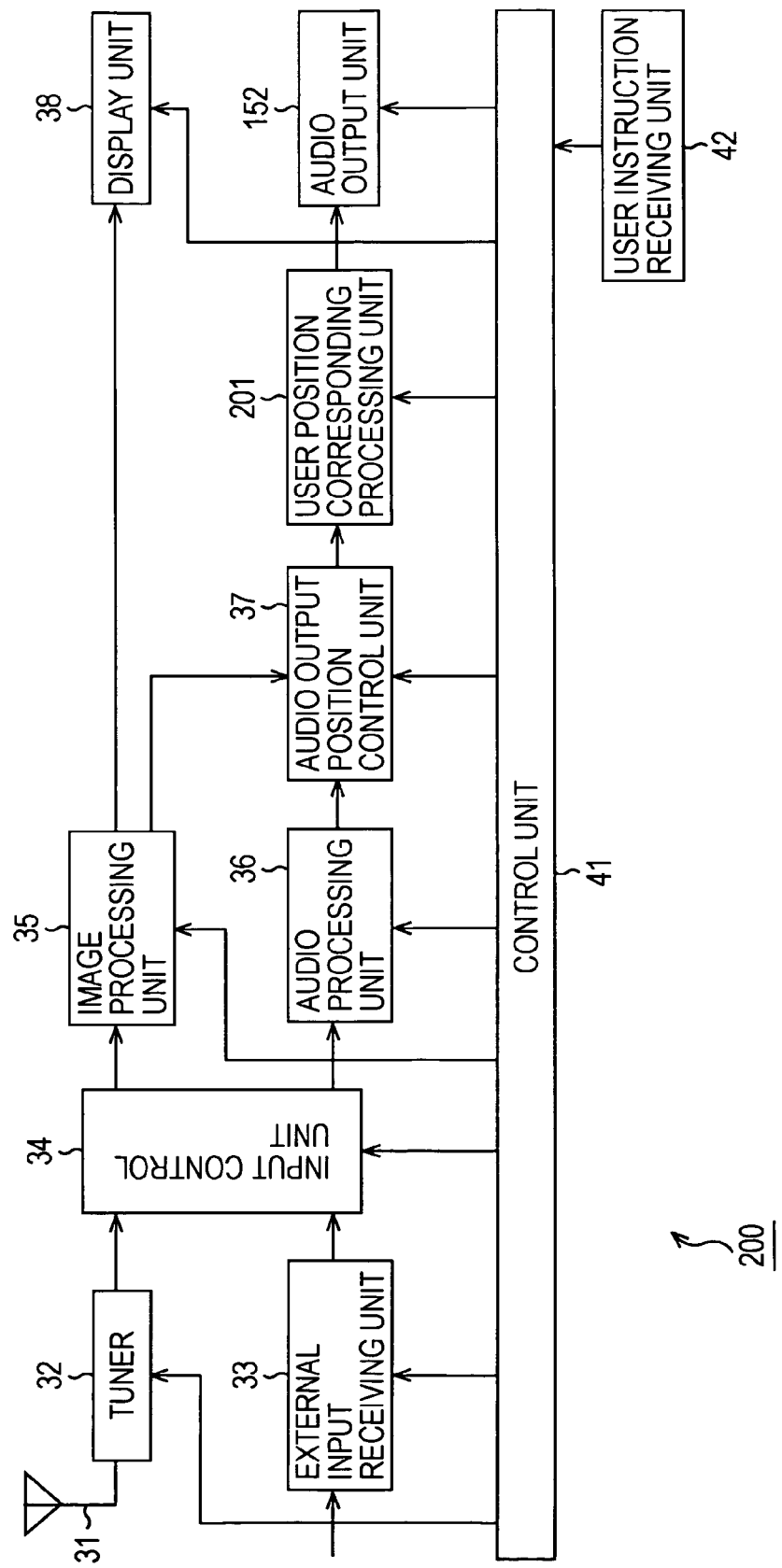
FIG. 19 is a block diagram illustrating yet another configuration example of the display device.

The image display device may have user position corresponding processing means (for example, a user position corresponding processing unit in FIG. 19) for detecting the position of the user viewing/listening to the image and audio, and for controlling delay amount of the audio output timing by the audio output means, according to the position of the user.

The audio output means may have multiple detachable speakers (for example, speakers in FIG. 22), and the image display device may further have region setting means (for example, a region setting unit in FIG. 24) for setting the regions to be divided by the screen region dividing means, according to the positions of the speakers connected thereto.

Figure 7:
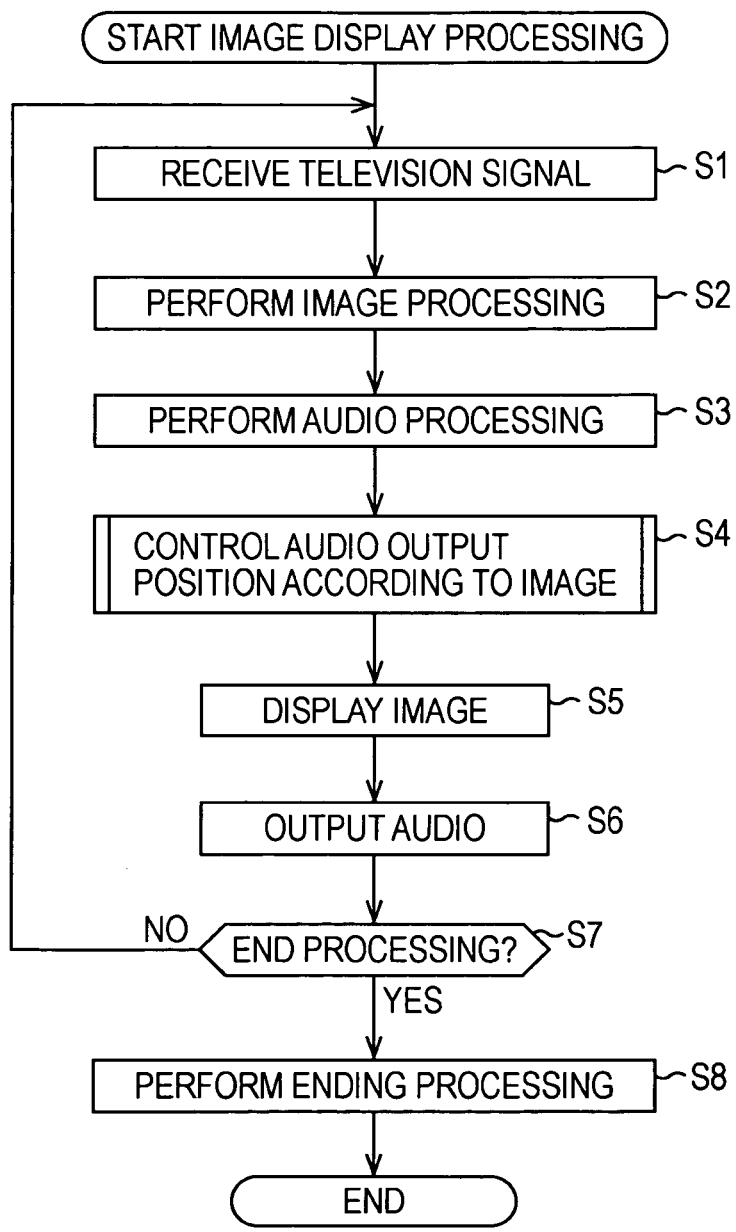
FIG. 7 is a flowchart for describing an example of image display process flow.

An image display method or program according to an embodiment of the present invention may include steps for displaying an image (for example, step S5 in FIG. 7), analyzing the image to be displayed, and selecting the position of audio output corresponding to the image, according to the image content (for example, step S4 in FIG. 7), and outputting the audio from the selected positions (for example, step S6 in FIG. 7).

An embodiment of the present invention will be described below with reference to the drawings.

Figure 2:
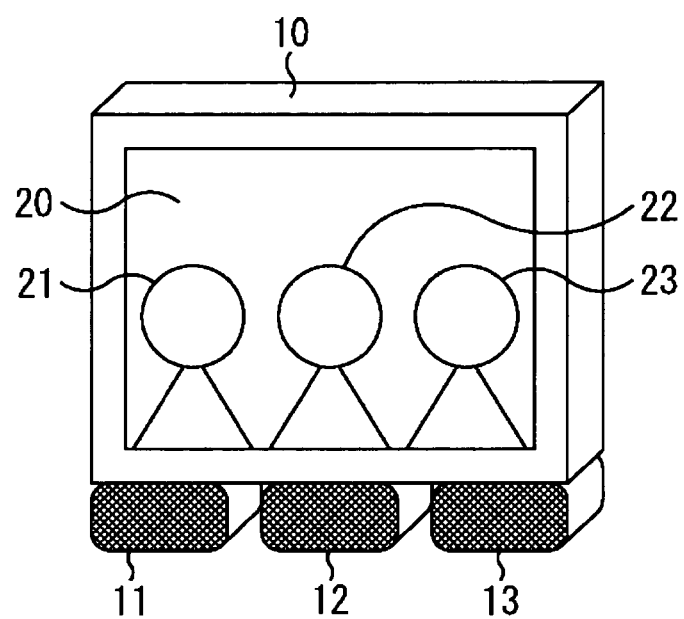
FIG. 2 is a diagram illustrating a configuration example of an external view of a display device to which an embodiment of the present invention has been applied.

FIG. 2 is a diagram illustrating a configuration example of an external view of a display device with application to the present invention. In FIG. 2, the display device 10 has three speakers (speaker 11 through speaker 13) on the lower side of the region for displaying images. The image display device 10 obtains image data or audio data by receiving television signals or by obtaining content data via external input, and displays the images corresponding to these image data as a display image 20 on a monitor, or outputs the audio corresponding to the display image 20 from speakers 11 through 13.

For example, in a case wherein three people, persons 21 through 23, are talking in the display image 20, the display device 10 analyzes the display image 20, outputs the voice of person 21 on the left end from the speaker 11 allocated on the left end, outputs the voice of person 22 in the center from the speaker 12 allocated in the center, and outputs the voice of person 23 on the right end from the speaker 11 allocated on the right end. Thus, by controlling the audio output position according to content of the display image 20, the display device 10 can output audio corresponding to the display image 20 so as to heighten the sensation of reality.

Figure 3:
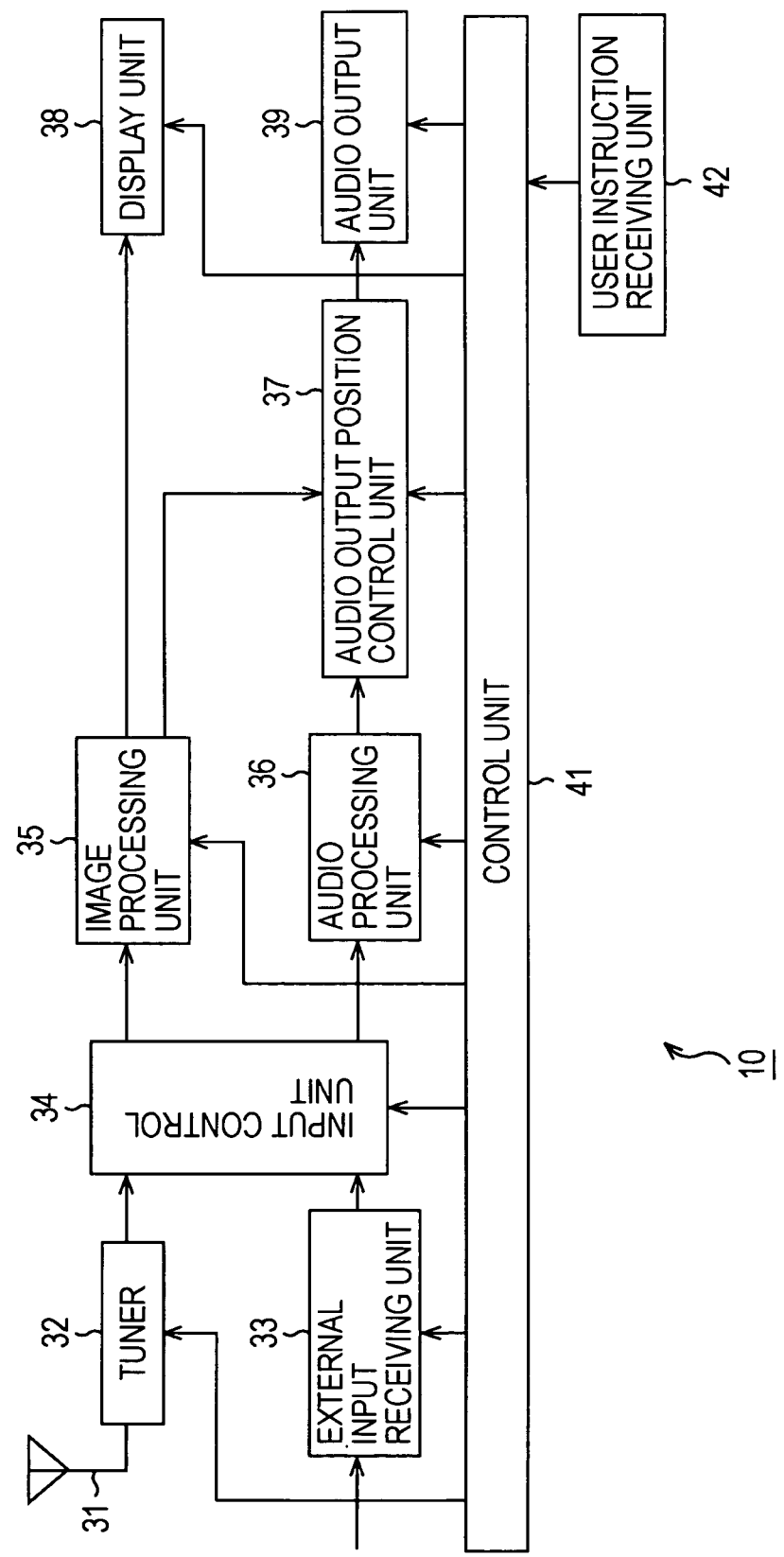
FIG. 3 is a block diagram illustrating an internal configuration example of the display device in FIG. 2.

FIG. 3 is a block diagram illustrating an internal configuration example of the display device 10. In FIG. 3, the display device 10 has an antenna 31, tuner 32, external input receiver 33, input control unit 34, image processing unit 35, audio processing unit 36, audio output position control unit 37, display unit 38, audio output unit 39, control unit 41, and user instruction receiving unit 42.

The tuner 31 selects the broadcast (selects the channel) desired by the user, receives the selected television signal via the antenna 31, and supplies the received television signal to the input control unit 34. The external input receiving unit has an external input terminal for obtaining content data from the exterior such as moving images or audio, obtains the content data via a cable connected to the external input terminal, and supplies this to the input control unit 34.

The input control unit 34 performs processing relating to television signal or content data input based on the user instruction and so forth, and for example performs processing such as extracting and dividing image data and audio data from the television signal or content data. Also, the input control unit 34 supplies the output image data to the image processing unit 35, and supplies the output audio data to the audio processing unit 36.

The image processing unit 35 performs data format conversion, for example, or performs image processing such as adjustments of brightness or color to process the image, as to the image data supplied from the input control unit 34, and supplies the image data which has been processed to the display unit 38 and displays the images. Also, the image processing unit 35 supplies the image data after processing to the audio output position control unit 37 also.

The audio processing unit 36 performs audio processing such as effects processing as to the audio data supplied from the input control unit 34, and supplies the audio data which has been processed to the audio output position control unit 37. Note that the audio data here is serving as information in monaural (single channel). Audio data in stereo format (multiple channels) will be described later.

The audio output position control unit 37 analyzes the image of the image data supplied from the image processing unit 35, and if the scene is one of people talking, the output destination of the audio data supplied from the audio processing unit 36 is controlled and the audio data is supplied to the audio output unit 39 so that the audio is output from the speaker near the position of the speaking person.

The display unit 38 has a monitor (not shown) for displaying images, and images corresponding to image data supplied from the image processing unit 35 is displayed to the monitor.

The audio output unit 39 has the speakers 11 through 13 in FIG. 2, and outputs the audio data supplied from the audio output position control unit 37 from the speaker (one of speakers 11 through 13) specified by the audio output position control unit 37.

For example, each of the speakers 11 through 13 of the audio output unit 39 are connected with the audio output position control unit 37 with a different bus each, and the audio output position control unit 37 selects the speaker from which to output the audio data by selecting the bus to output the audio data. With the audio output unit 39, audio is output from the speaker supplied by the audio data.

Note that an arrangement may be made wherein the audio output unit 39 has a switching function for switching the output destination, and while the audio output position control unit 37 supplies the audio data to the audio output unit 39 via a common bus which is used in the event of outputting from all of the speakers, control information indicating the audio data output destination is supplied, the audio output unit 39 switches a switch based on the control information thereof, and audio data is output from the speaker selected by the audio output position control unit 37.

The control unit 41 controls the entire display device 10 including the tuner 32, external input receiver 33, input control unit 34, image processing unit 35, audio processing unit 36, audio output position control unit 37, display unit 38, and audio output unit 39, based on user instructions received by the user instruction receiver 42 for example, and so forth.

The user instruction receiver 42 has a photoreceptor for receiving an infrared signal including user instructions, by receiving infrared light output from the remote commander serving as an input device which is operated by a user, for example, and upon obtaining the supplied user instructions, supplies this to the control unit 41. Note that the user instruction receiver 42 may be arranged so as to have an input device such as a button or switch, or a keyboard or mouse or the like.

FIG. 4 is a block diagram showing a detailed configuration example of the audio output position control unit 37. In FIG. 4, the audio output position control unit 37 has a screen region dividing unit 51, difference average value calculating unit 52, determining unit 53, and audio output control unit 54.

The screen region dividing unit 51 divides the display screen into multiple regions according to the disposition of the speakers, and assigns multiple regions thereto, as to each frame image of the image data supplied by the image processing unit 35.

Figure 5:
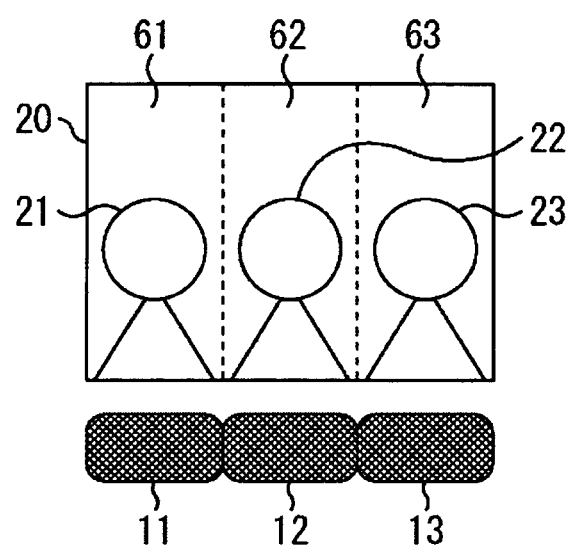
FIG. 5 is a model diagram illustrating an example of a region division.

An example of region division is illustrated in FIG. 5. As shown in FIG. 5, the display device 10 has three speakers (speakers 11 through 13) in a row in a horizontal direction. Accordingly, the screen region dividing unit 51 divides the display image 20 into three divided regions in the horizontal direction, dividing into regions 61 through 63. In FIG. 5, the image of persons 21 through 23 included in the display image 20 are each assigned to the regions 61 through 63, by this division.

Returning to FIG. 4, the difference average value calculating unit 52 specifies the portions showing predetermined features in each frame image of the image data, and measures the amount of variance between frames of the brightness value of the feature portions thereof, by calculating the difference of brightness value of such portions between frames. Then the difference average value calculating unit 52 calculates the average value of the amount of variance between frames for each region. A detailed configuration example of the difference average value calculating unit 52 will be described later. The difference average value calculating unit 52 supplies the calculated difference average value to the determining unit 53.

The determining unit 53 determines whether or not to perform audio output position control, and notifies the determining results to the audio output control unit 54. The audio output control unit 54 controls the output position of the supplied audio data based on the determining results of the determining unit 53, and supplies the audio data to one of speakers 11 through 13 of the audio output unit 39. In the case of not controlling the output position of the audio data, the audio output control unit 54 supplies the audio data to all speakers 11 through 13 of the audio output unit 39.

Figure 6:
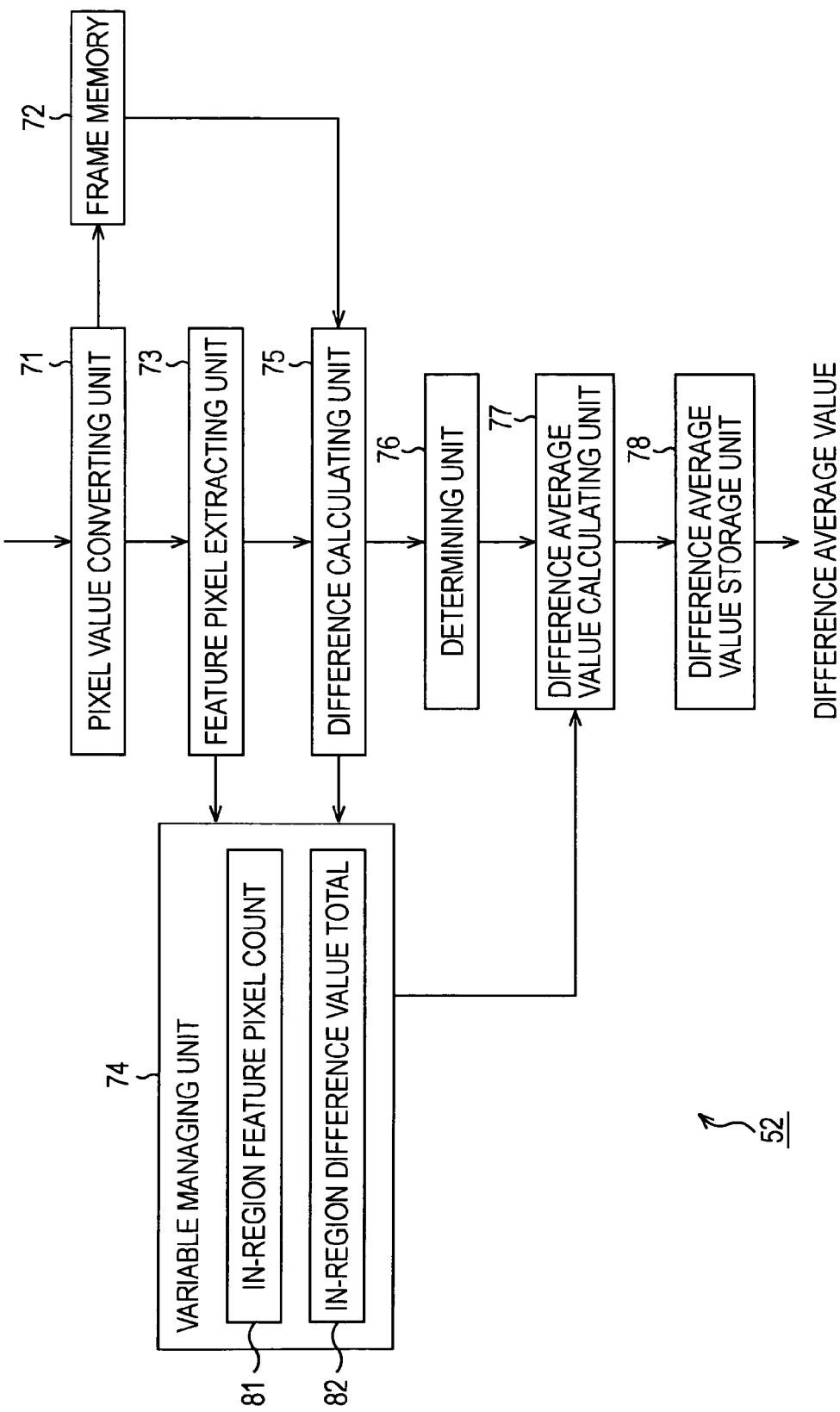
FIG. 6 is a block diagram illustrating a detailed configuration example of a difference average value calculating unit in FIG. 4.

FIG. 6 is a block diagram showing a detailed configuration example of the difference average value calculation unit 52. In FIG. 6, the difference average value calculating unit 52 has a pixel value converting unit 71, frame memory 72, feature pixel extracting unit 73, variable managing unit 74, difference calculating unit 75, determining unit 76, difference average calculating unit 77, and difference average value storage unit 78.

Upon obtaining image data supplied from the screen region diving unit 51, the pixel value converting unit 71 converts the image data to a predetermined data format for each pixel, and supplies this to the frame memory 72 so as to be held. The frame memory 72 holds the image data the length of one frame with a frame as a unit. In other words, the frame memory 72 holds the data of the frame image until processing starts as to the next frame image. Also the pixel value converting unit 71 supplies the image data or region information to a feature pixel extracting unit 73.

The feature pixel extracting unit 73 extracts feature pixels which are pixels having a predetermined feature which are included in the image data. For example, the feature pixel extracting unit 73 extracts feature pixels (pixels included in predetermined color value ranges) indicating features of a person such as hue, color saturation, luminance, brightness, RGB values and so forth. The feature pixel extracting unit 73 increments the in-region feature pixel count 81 serving as a variable held and managed by the variable managing unit 74 for every feature pixel extraction.

The variable managing unit 74 stores the in-region feature pixel count 81 serving as a variable for counting the number of feature pixels for each region, and the in-region difference value total 82 serving as a variable for totaling the difference value of the brightness value of the feature pixels between frames, and managing the updating of input/output of the values thereof. For example, the variable managing unit 74 increments the in-region feature pixel count 81 each time the feature pixel extracting unit 73 extracts a feature pixel. Also, the variable managing unit 74 obtains the difference value of the brightness value of the feature pixels between frames, which is supplied from the difference calculating unit 75, and adds the difference value thereof to the in-region difference value total 82. Further the variable managing unit 74 provides the in-region feature pixel count 81 or the in-region difference value total 82, for example, to the difference average value calculating unit 77 as needed.

Upon obtaining the image data one frame prior to that held by the frame memory 72, the difference calculating unit 75 calculates the difference value of the feature pixel extracted by the feature pixel extracting unit 73, between the brilliance value one frame prior and the brilliance value of the current frame. The difference calculating unit 75 supplies the calculated difference value to the variable managing unit 74.

The determining unit 76 receives the processing results and determines whether or not the processing has been performed as to the pixels within the entire region, and upon all of the pixel processing within the region being completed, this information is notified to the difference average value calculating unit 77.

The difference average value calculating unit 77 obtains the in-region feature pixel count 81 and in-region difference value total 82 stored in the variable managing unit 74, and using these calculates a difference average value serving as an average value of the difference values for each region. Also, upon the difference average value storage unit 78 storing the difference average value for all of the regions, the difference average value thereof is supplied to the determining unit 53.

Next, the specific processing flow for each portion will be described. First, an example of the flow of the image display processing executed with the display device 10 will be described with reference to the flowchart in FIG. 7.

In step S1, the input control unit 34 receives a television signal via the tuner 32, and extracts image data or audio data from the received television signal. In step S2, the image processing unit 35 performs image processing as to the image data. In step S3, the audio processing unit 36 performs audio processing as to the audio data. In step S4, the audio output position control unit 37 controls the speaker (audio output location) to output the audio of the audio data according to the image of the image data. Details of this audio output position control processing will be described later.

In step S5, the display unit 38 displays images of the supplied image data. In step S6, the audio output unit 39 outputs audio of the supplied audio data from a speaker (position) based on control of the audio output position control unit 37.

In step S7, the control unit 41 determines whether or not to end the image display processing, and in the event that determination is made to not end the processing, the flow returns to step S1, and repeats the processing thereafter. Also, in the event that determination is made in step S7 to end the processing, the control unit 41 advances the processing to step S8, performs ending processing such as turning off the power source, and ending the image display processing.

Next, a detailed flow example of the audio output position control processing executed in step S4 in FIG. 7 will be described with reference to the flowchart in FIG. 8.

When the audio output position control processing is started, the screen region dividing unit 51 divides the screen region into multiple regions corresponding with the speaker positioning in step S21. In step S22, the difference average value calculating unit 52 calculates the difference average value of the pixels (feature pixels) showing predetermined features. Details of the feature pixel difference average value calculation processing will be described later.

In step S23, the determining unit 53 determines whether or not the difference average value for all regions is at or below a predetermined threshold. If the difference average value is determined to be above the threshold value at even one, the determining unit 53 advances the flow to step S24. In step S24, the audio output control unit 54 specifies the region with the greatest difference average value, that is to say, the region wherein the image movement is most pronounced, such as an image showing features such as a mouth or the like, for example, determines that the region has a person speaking, selects the speaker corresponding to that region as the audio output speaker, and supplies the audio data based on this selection to the audio output unit 39, and outputs the audio from the speaker corresponding to the region wherein the difference average value is greatest. Upon ending the processing in step S25, the audio output control unit 54 advances the processing to step S27.

Also, in step S23, in the event that determination is made that the difference average value for all regions is at or below the threshold, the determining unit 53 advances the processing to step S26. In step S26, the audio output control unit 54 supplies the audio data to all of the speakers and outputs the audio from all of the speakers. Upon ending the processing in step S26, the audio output control unit 54 advances the processing to step S27.

In step S27, the audio output control unit 54 determines whether or not to end the audio output position control processing, and in the event that determination is made not to end the processing, the flow is returned to step S22, and the processing thereafter is repeated. Also, in the event that determination is made in step S27 that the audio output position control processing is ended, the audio output control unit 54 advances the flow to step S28, performs ending processing, ends the audio output position control processing, returns the processing to step S4 in FIG. 7, and executes the processing of step S5 and thereafter.

Figure 9:
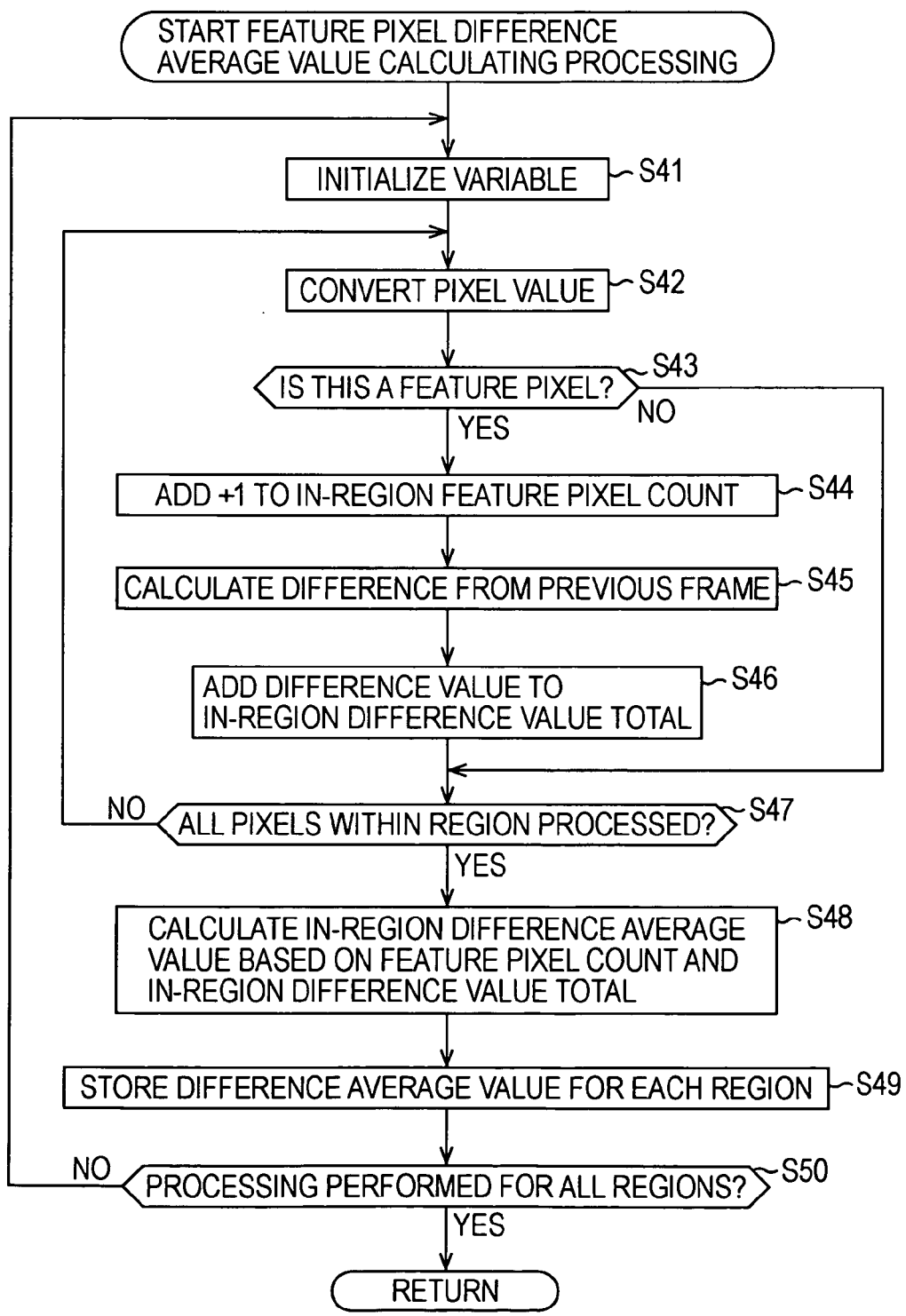
FIG. 9 is a flowchart for describing an example of feature pixel difference average value calculating processing flow.

Next, a detailed flow example of the feature pixel difference average value calculating processing executed in step S22 in FIG. 2 will be described with reference to the flowchart in FIG. 9.

In step S41, the variable managing unit 47 initializes variables such as the in-region feature pixel count 81 and in-region difference value total 82. In step S42, the pixel value converting unit 71 converts the pixel value. The feature pixel extracting unit 73 determines in step S43 whether or not the pixel with pixel value converted by the pixel value converting unit 71 is a feature pixel having the features of an image of a person, and in the event that determination is made that this is a feature pixel, the flow proceeds to step S44.

In step S44, the variable managing unit 74 adds "+1" to the in-region feature pixel count 81. In step S45, the difference calculating unit 75 calculates the difference of the brightness value with that of the previous frame. In step S46, the variable managing unit 74 adds the difference value to the in-region difference value total 82. Upon ending the processing in step S46, the variable managing unit 74 advances the processing to step S47. Also, if the pixel in step S43 is determined not to be a feature pixel, the feature pixel extracting unit 73 advances the processing to step S47.

In step S47, the determining unit 76 determines whether or not all of the pixels within the region have been processed, and in the event that determination is made that the pixels have not all been processed, the processing is returned to step S42, and the processing thereafter is repeated for the next pixel. Also, in the event that determination is made in step S47 that all of the pixels within the region have been processed, the determining unit 76 advances the processing to step S48.

In step S48, the difference average value calculating unit 77 calculates the difference average value within the region, based on the values of the in-region feature pixel count 81 and the in-region difference value total 82. The difference average value storage unit 78 stores the calculated difference average value in step S49, and in step S50, determines whether or not the processing has ended for all of the regions, and in the event that determination is made that there is a region not yet processed, the processing is returned to step S41, and the processing thereafter is repeated for the next region.

Figure 8:
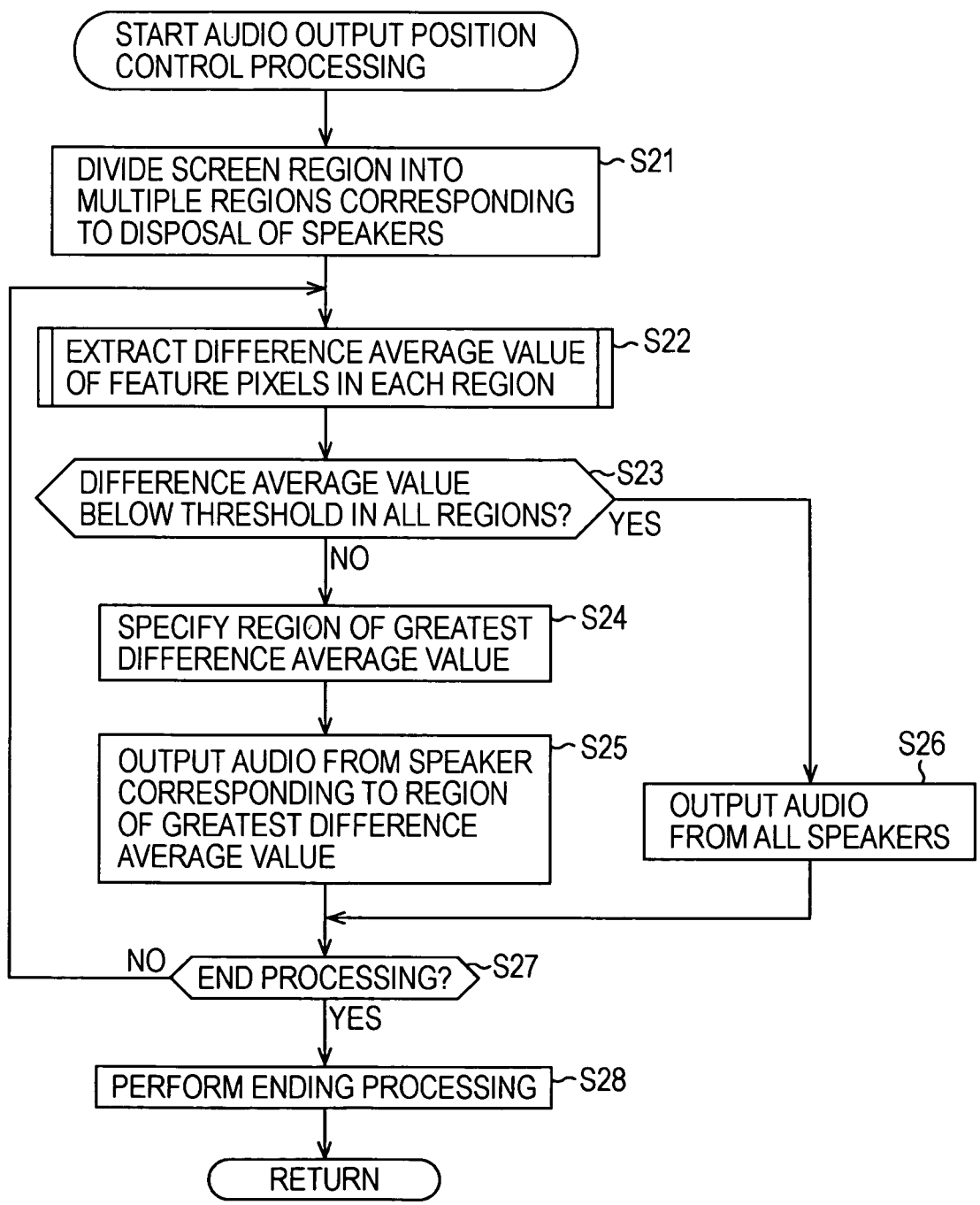
FIG. 8 is a flowchart for describing an example of audio output position control processing flow.

Also, in the event that determination is made in step S50 that all regions have been processed, the difference average value storage unit 78 ends the feature pixel difference average value calculating processing, returns the processing to step S22 in FIG. 8, and executes processing for step S23 and thereafter.

By performing such various processing as above, the display device 10 analyzes the display image 20 as to a display image 20 such as that shown in FIG. 2, and thus not only can the persons 21 through 23 be specified from the features in the pixel values, but which of the persons 21 through 23 is talking can be specified by using the difference average values between frames, and the audio output position can be controlled according to the content in the display image 20, so as to output the voice of person 21 from speaker 11, output the voice of person 22 from speaker 12, and output the voice of person 23 from speaker 13, for example.

With such an arrangement, the display device 10 can output the audio corresponding to the displayed image so as to heighten the sensation of reality.

Figure 10A:
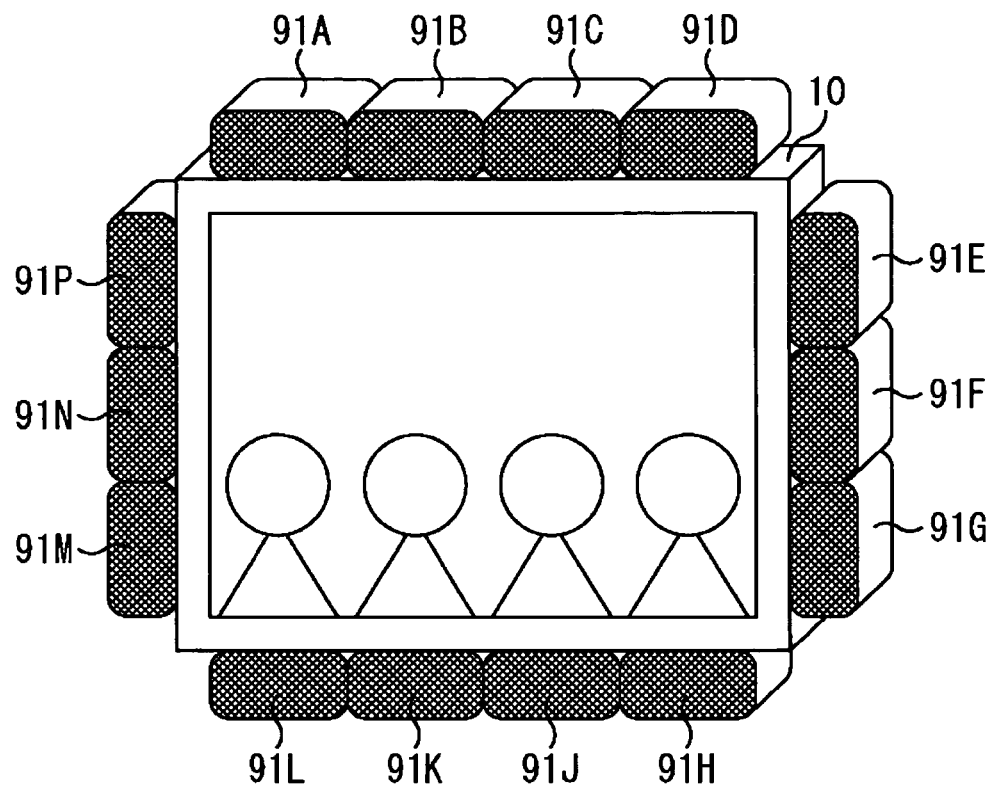
FIG. 10 is a diagram illustrating another configuration example of an external view of the display device.
Figure 10B:
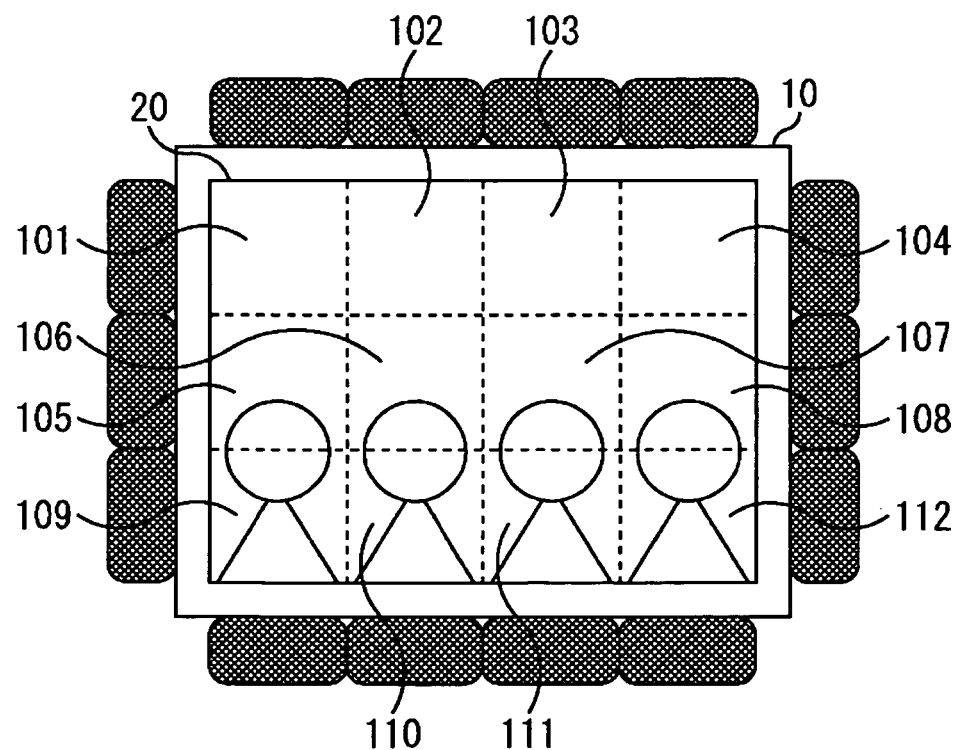

Note that the number of speakers may be optional, and the positioning thereof also optional. Also, the regions and speakers do not need to be arranged with a one-to-one association, but may be arranged so that one speaker corresponds to multiple regions, or one region corresponds to multiple speakers. For example, as shown in FIG. 10A, an arrangement may be made wherein the display device 10 has fourteen speakers (speaker 91A through speaker 91P) so as to surround the display image 20. In this case, the display image 20 is divided into a total of twelve regions (region 101 through region 112), with three in the vertical direction and four in the lateral direction, as shown in FIG. 10B.

At this time, for example, speakers 91A and 91P correspond to region 101, speaker 91B corresponds to region 102, speaker 91C corresponds to region 103, speakers 91D and 91E correspond to region 104, speaker 91N corresponds to region 105, speakers 91B, 91F, 91K, and 91N correspond to region 106, speakers 91C, 91F, 91J, and 91N correspond to region 107, speaker 91F corresponds to region 108, speakers 9191L and 91M correspond to region 109, speaker 91K corresponds to region 110, speaker 91J corresponds to region 111, and speakers 91G and 91H corresponds to region 112. It goes without saying that association by another method can be made as well.

Note that the present invention may be arranged in any manner as long as an image is displayed and audio is output to correspond to the image thereof. For example, a system using a projector such as that shown in FIG. 11 may be used. In the case of FIG. 11, a projector 122 is allocated on the far back side of a screen 121, and the projector 122 projects the image onto the rear side of the screen 121. Speakers 131 through 142 are linearly allocated on the forward side of the screen 121, facing the far back side, and are arranged so that the audio corresponding to the image 123 is output from the speakers. In other words, speakers 131 through 142 output the audio from the rear side of the image 123 which is projected onto the screen 121 by the projector 122.

With such a system, as described above, by selecting and outputting the audio from speakers 131 through 142 according to the content in the projected image 123, for example, the voice of a talking person can be output from the speaker directly behind the person. Accordingly, with the system in FIG. 11, the audio corresponding to the displayed image can be output so as to increase the sensation of reality.

Note that an arrangement may be made wherein the volume output from each speaker is controlled instead of selecting the speaker outputting the audio. In other words, instead of controlling whether or not each speaker outputs audio, an arrangement may be made as described above wherein output is primarily from the speaker corresponding to a selected region, and wherein the volume of the audio output from speakers corresponding to the other regions can be decreased.

Also, an arrangement may be made wherein there are multiple channels for audio data, for example, processing the audio data into separate channels for audio of which the audio output position in the display image 20 cannot be specified, and audio of which the audio output position in the display image 20 can be specified such as that of a voice of a person.

Figure 12:
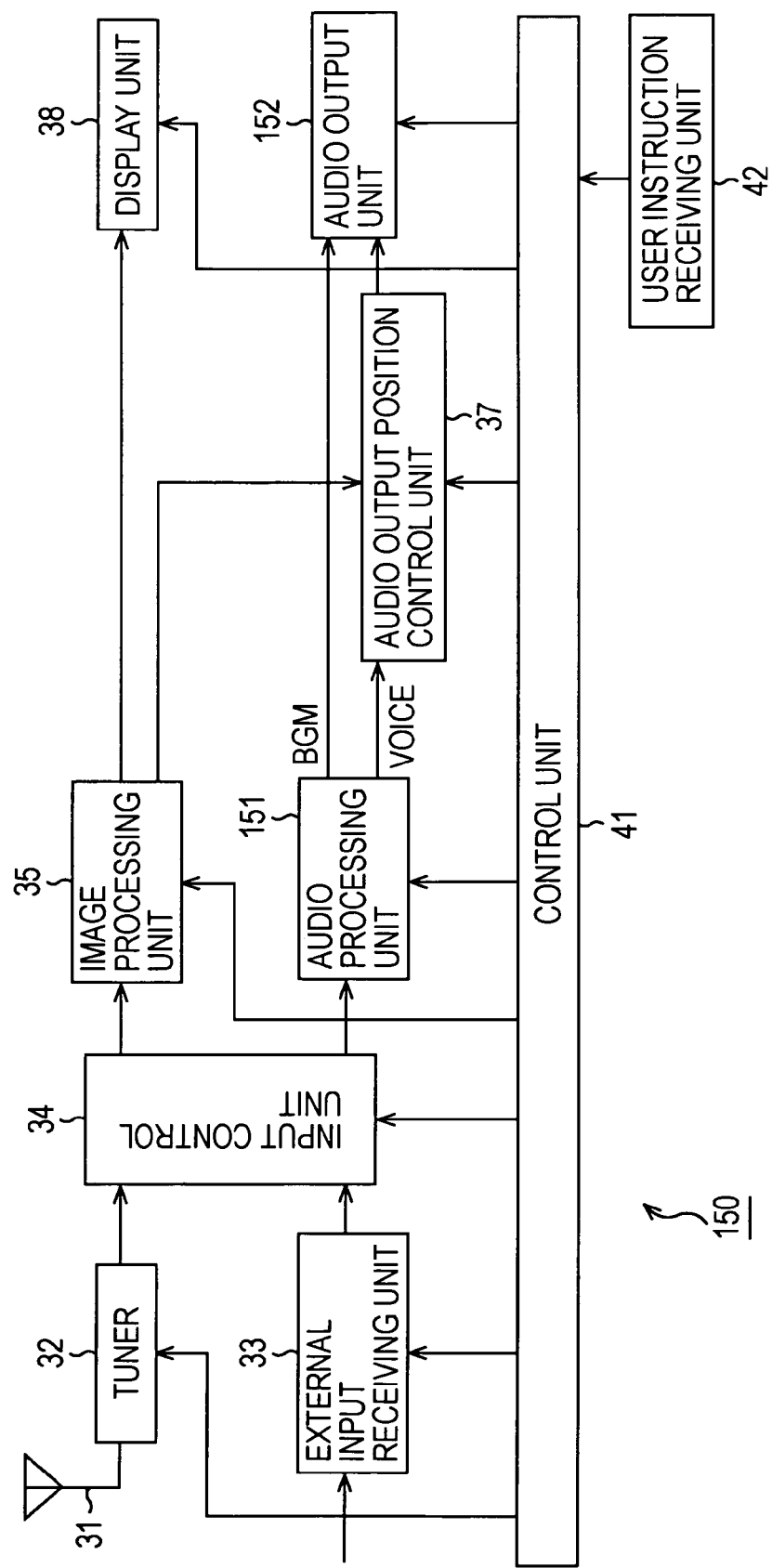
FIG. 12 is a block diagram illustrating another configuration example of the display device.

FIG. 12 is a block diagram showing a configuration example of the display device in such a case. In FIG. 12, a display device 150 has a configuration basically similar to that of the display device 10, but an audio processing unit 151 differs from the audio processing unit 36, and audio for each channel of the input audio data is divided and output. Audio such as background music which cannot specify the audio output position is supplied to a direct audio output unit 152, and the audio output position control unit 37 processes only audio which can specify the audio output position, such as the voice of a person. The audio output unit 152 obtains the audio data for each channel, and synthesizes each channel for each speaker and outputs the audio.

Thus, the display device may be arranged to control the output position of the audio only for a portion of channels. Note that the audio output position for each channel may be controlled so as to be independent from one another.

Further, it goes without saying that the display device may control the output positions of the audio data of left and right two channels, as with stereo. In this case, as shown in FIG. 13, the speakers for the left and right two channels can be arranged to be one set, and may be processed similar to the audio data with the above-described monaural format.

Figure 13:
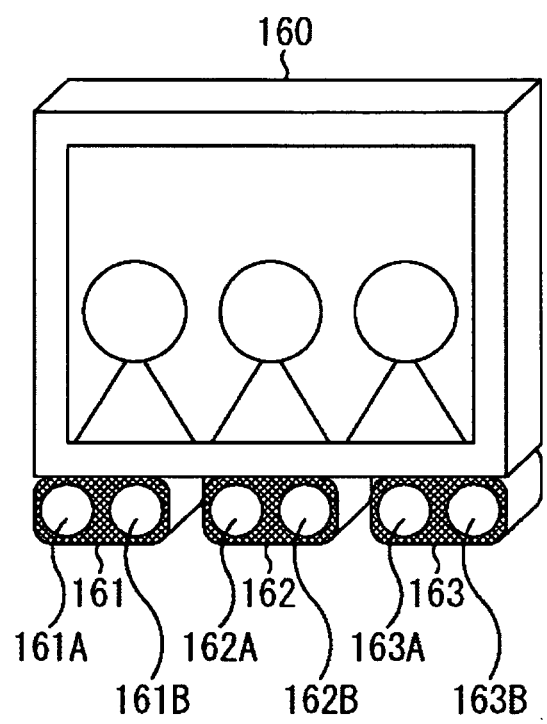
FIG. 13 is a diagram illustrating yet another configuration example of an external view of the display device.

For example, in the case of FIG. 13, a display device 160 has three stereo speakers (stereo speakers 161 through 163) allocated linearly in the horizontal direction. The stereo speaker 161 has a left speaker 161A and a right speaker 161B, and can output audio on left and right two channels. The stereo speaker 162 similarly has a left speaker 162A and a right speaker 162B, and can output audio on the left and right two channels. The stereo speaker 163 similarly has a left speaker 163A and a right speaker 163B, and can output audio on the left and right two channels.

As in the case with monaural, the display device 160 selects a stereo speaker for outputting audio on the left and right two channels, from the stereo speakers 161 through 163, based on the display image 20, and outputs audio from the left and right two channels from (the left speaker and right speaker of) the selected stereo speaker. Note that at this time, control of the output position performed based on the image can be corrected, using the volume difference of the left and right channels of the stereo audio.

In the case of not controlling the audio output position, the display device 160 uses stereo speakers 161 through 163 as one stereo speaker, and outputs the stereo sound from one direction. For example, the audio output from the stereo speaker 162 is stopped, the audio of the left channel is output from the stereo speaker 161 (both the left speaker 161A and the right speaker 161B), and the audio of the right channel is output from the stereo speaker 163 (both the left speaker 163A and the right speaker 163B).

Figure 14:
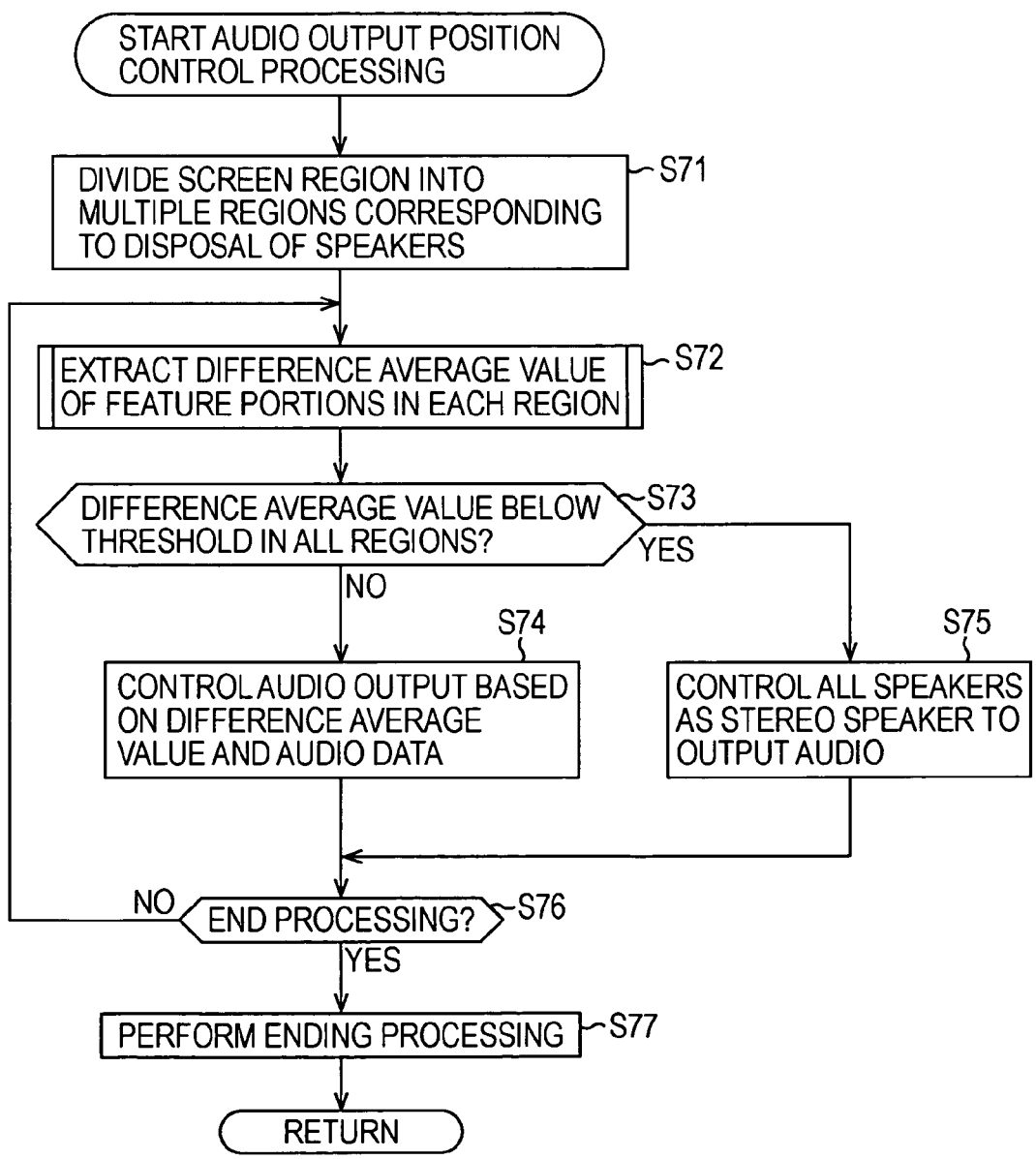
FIG. 14 is a flowchart for describing another example of audio output position control processing flow.

An example of the flow of such audio output position control processing will be described with reference to the flowchart in FIG. 14.

Upon the audio output position control processing being started, the screen region dividing unit 51 divides the screen region into multiple regions corresponding to the speaker positioning in step S71. In step S72, the difference average value calculating unit 52 calculates the difference average value of the pixels (feature pixels) showing a predetermined feature, for each divided region, as described with reference to the flowchart in FIG. 9.

In step S73, the determining unit determines whether or not the difference average value over all of the regions is at or below a predetermined threshold, and if the difference average values is above the threshold for even one, the processing is advanced to step S74. In step S74, the audio output control unit 54 controls the audio output based on the difference average value and the audio data. Upon the processing in step S74 ending, the audio output control unit 54 advances the processing to step S76.

Also, in the event that determination is made in step S73 that the difference average values for all of the regions are at or below the threshold, the determining unit 53 advances the processing to step S75. In step S75, the audio output control unit 54 controls all of the speakers as stereo speakers to output the audio. Upon ending the processing in step S75, the audio output control unit 54 advances the processing to step S76.

In step S76, the audio output control unit 54 determines whether or not to end the audio output position control processing, and in the event that determination is made not to end, the processing is returned to step S72, and the processing thereafter is repeated. Also, if the audio output position control processing is determined to end in step S76, the audio output control unit 54 advances the processing to step S77, performs ending processing, the audio output position control processing is ended, the flow is returned to the processing in step S4, and the processing for step S5 and thereafter is executed.

Thus, the display device can output audio corresponding to the display image with greater sensation of reality, even when the audio data has many channels.

Note that the audio output control unit 54 may be arranged so as to correct the control of the output position performed based on the image, by correcting the difference average value using the volume difference of the left and right channels of the stereo audio. A detailed configuration example of the audio output control unit 54 in such a case is illustrated in FIG. 15.

Figure 15:
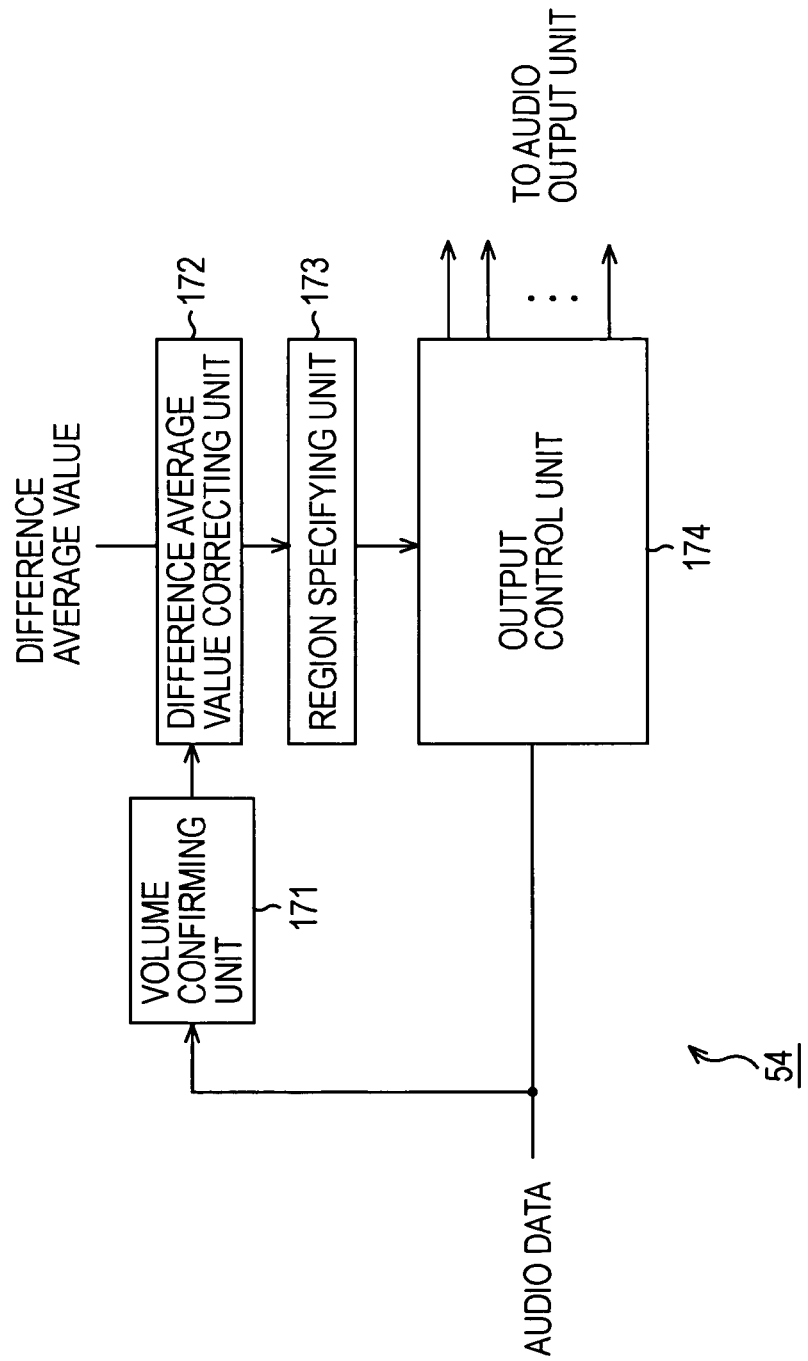
FIG. 15 is a block diagram illustrating a detailed configuration example of an audio output control unit.

In FIG. 15, the audio output control unit 54 has a volume confirming unit 171, difference average value correcting unit 172, region specifying unit 173, and output control unit 174.

The volume confirming unit 171 confirms the volume difference of the left and right channels of the audio data, confirms primarily which direction of the left and right directions the audio is being output, and supplies the confirmation results thereof to the difference average value correcting unit 172. The difference average value correcting unit 172 corrects the value of the difference average value for each region with a predetermined ratio based on the confirmation results thereof, and supplies the difference average value after correcting to the region specifying unit 173. The region specifying unit 173 specifies the region for outputting the audio, based on the corrected difference average value, and supplies the specifying results thereof to the output control unit 174. The output control unit 174 supplies the audio data to the audio output unit 39 so that the audio is output from the speaker corresponding to the region from which the audio is output, based on the specifying results thereof.

Figure 16:
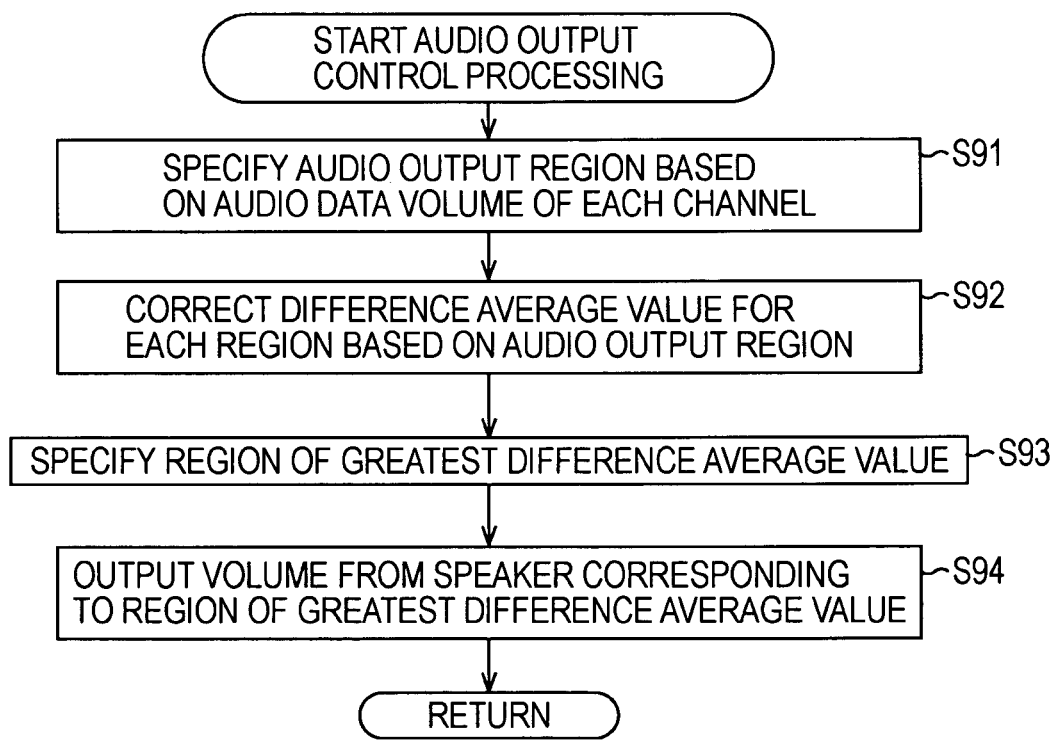
FIG. 16 is a flowchart for describing an example of audio output control processing flow.

Next, an example of the flow of the audio output control processing executed by the audio output control unit 54 in step S74 in FIG. 14 will be described with reference to the flowchart in FIG. 16.

First, in step S91, the audio confirming unit 171 specifies an audio output region serving as a region for outputting audio based on the volume of each channel of the audio data. In step S92, the difference average value correcting unit 172 corrects the difference average value for each region, based on the audio output regions specified in step S91. For example, the difference average value correcting unit 172 may increase the difference average value of the audio output region by 10%, and decrease the difference average value of all other regions by 10% and so forth, thereby increasing the difference average value of the audio output region.

In step S93, the region specifying unit 93 specifies the region wherein the difference average value after correction is greatest. In step S94, the output control unit 174 controls output so as to output audio from the speaker corresponding to the region wherein the difference average value is greatest. Upon ending the processing in step S94, the audio output control unit 54 ends the audio output control processing, returns the processing to step S74 in FIG. 14, and executes the processing in step S76 and thereafter.

Note that an arrangement may be made wherein the audio output control is corrected by using audio data with a method other than that described above. For example, in the case of controlling the volume size of the audio output from each speaker, as opposed to controlling the switchover of the speaker from which audio is output, based on the content of the display image, the display device may be arranged so as to correct the volume of each speaker determined according to the content in the display image, based on the volume of the left and right channels of the audio data.

Figure 17:
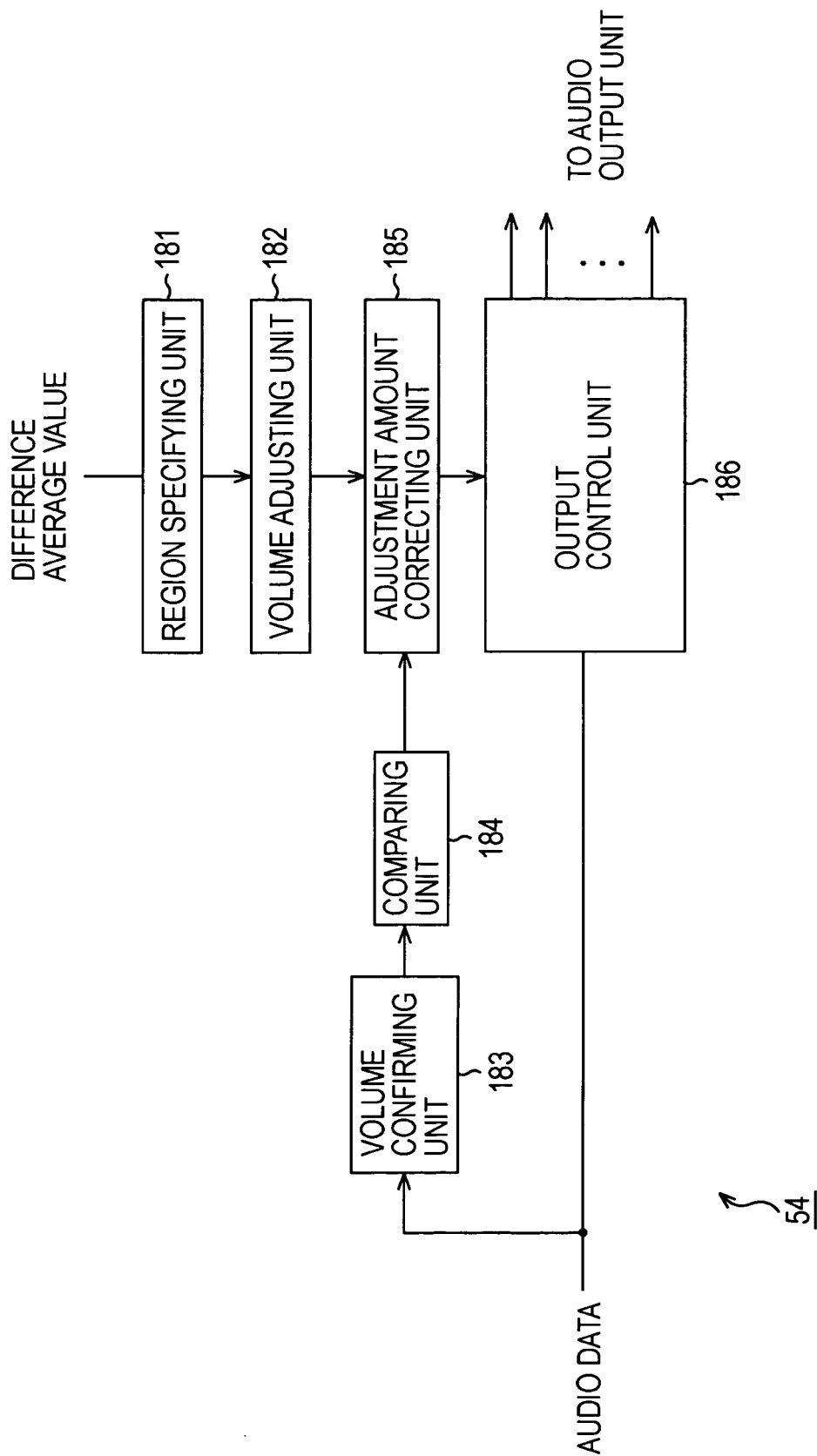
FIG. 17 is a block diagram illustrating another detailed configuration example of an audio output control unit.

A detailed configuration example of the audio output control unit 54 in this case is shown in FIG. 17. In FIG. 17, the audio output control unit 54 has a region specifying unit 181, volume adjusting unit 182, volume confirming unit 183, comparing unit 184, adjustment amount correcting unit 185, and output control unit 186.

The region specifying unit 181 specifies the region with the greatest difference average value, and supplies the result thereof to the volume adjusting unit 182 and the confirming unit 184. The volume adjusting unit 182 generates control information for adjusting the volume output from the speakers corresponding to each region, based on the results thereof, and supplies the control information to the adjustment amount correcting unit 185. The audio confirming unit 183 specifies the region of the display image wherein audio is output, based on the volume difference of the left and right channels of the audio data, and supplies the results thereof to the comparing unit 184. The comparing unit 184 compares the information supplied from the region specifying unit 181 and the information supplied from the volume confirming unit 183, determines whether or not the regions specified by both units match, and the determining results thereof are supplied to the adjustment amount correcting unit 185.

If the region wherein the difference average value specified by the region specifying unit 181 is greatest and the region wherein the audio specified by the volume confirming unit 183 is output matches based on the determining results, the adjustment amount correcting unit 185 estimates that the bias of the audio output position is strong and also the specified precision of the region is high, and so corrects the control information generated by the volume adjustment unit 182, then re-adjusts so that the volume difference (the volume difference of each speaker) between the regions is increased. Conversely, if the region wherein the difference average value specified by the region specifying unit 181 is greatest and the region wherein the audio specified by the volume confirming unit 183 is output does not match, the adjustment amount correcting unit 185 estimates that the bias of the audio output position is weak and also the specified precision of the region is low, and so corrects the control information generated by the volume adjustment unit 182, then re-adjusts so that the volume difference (the volume difference of each speaker) between the regions is decreased.

The adjustment amount correcting unit 185 supplies the control information wherein the adjustment amount is corrected to the output control unit 186. The output control unit 186 controls the volume of the audio data output from each speaker, based on the supplied control information.

Figure 18:
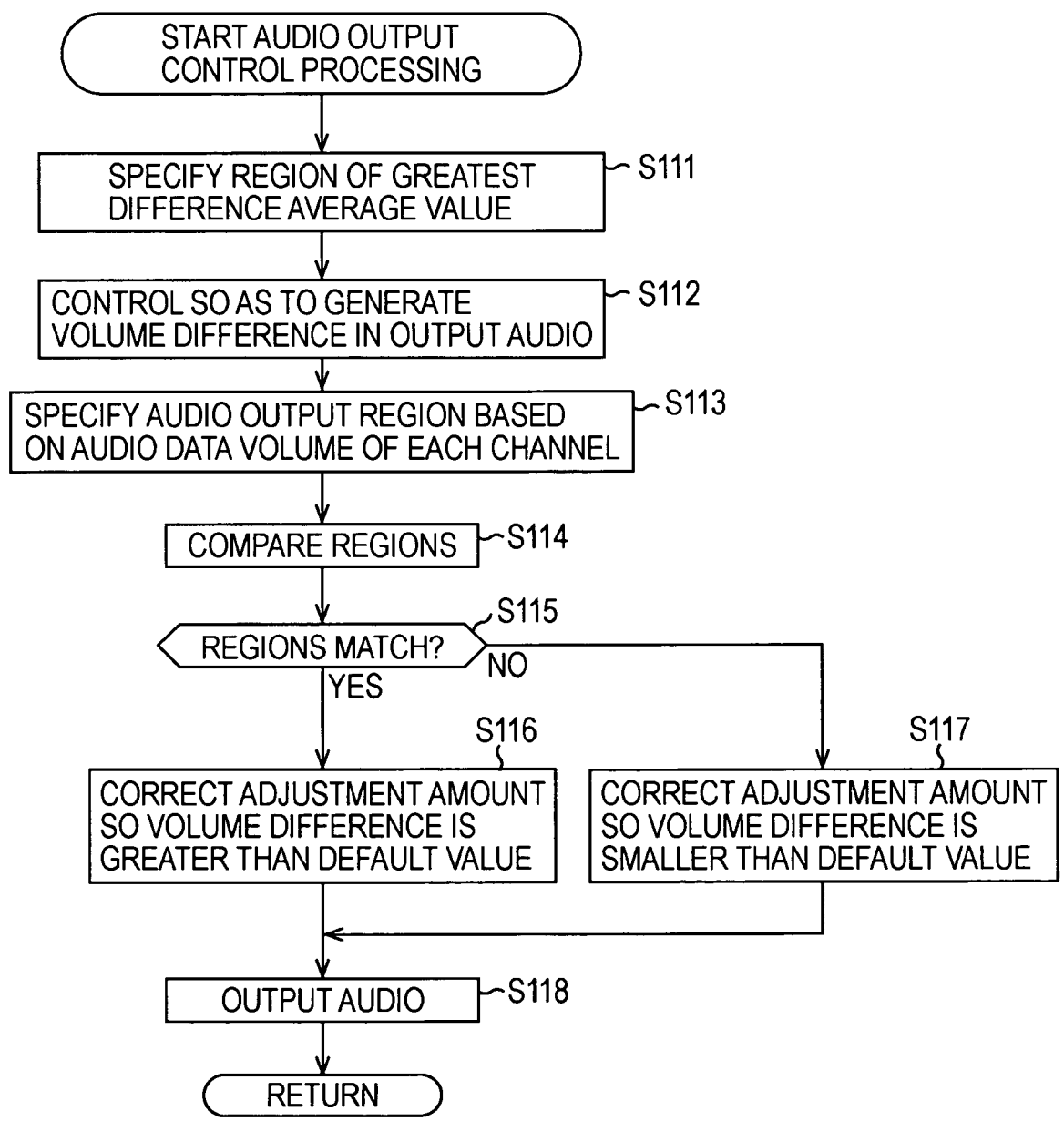
FIG. 18 is a flowchart for describing another example of audio output control processing flow.

Next, an example of the flow of the audio output control processing executed by the audio output control unit 54 in step S74 in FIG. 14 will be described with reference to the flowchart in FIG. 18.

The region specifying unit 181 references the difference average value of each supplied region in step S111 and specifies the region with the greatest difference average value. In step S112, the volume adjusting unit 182 generates control information for adjusting the output audio so that an output audio volume difference occurs between the speakers, based on the specifying results of the processing in step S111.

In step S113, the volume confirming unit 183 specifies the audio output regions based on each channel of the audio data. In step S114, the comparing unit 184 compares the region with the greatest difference average value specified in the processing in step S111 and the audio output region specified in the processing in step S113.

In step S115, the confirming unit 184 determines whether or not these two regions match, and in the event that determination is made that they match, the processing is advanced to step S116. In step S116, the adjustment amount correcting unit 185 corrects the adjustment amount so that the volume difference is greater than a default value set in step S112. Upon ending the processing in step S116, the adjustment amount correcting unit 185 advances the processing to step S118.

Also, in the event that determination is made that the two regions do not match, the comparing unit 184 advances the processing to step S117. In step S117, the adjustment amount correcting unit 185 corrects the adjustment amount so that the volume difference is less than the default value set in step S112. Upon ending the processing in step S117, the adjustment amount correcting unit 185 advances the processing to step S118.

In step S118, the output control unit 186 adjusts the volume of the output audio for each speaker based on the control information with the corrected adjustment amount, and outputs the audio. Upon the processing in step S118 ending, the audio output control unit 54 ends the audio output control processing, returns the processing to step S74 in FIG. 14, and executes the processing in step S76 and thereafter.

Thus, by correcting the audio output control which is determined by analysis of the display image, using analysis of the audio data, the display device can accurately perform audio output control, and can output audio so as to heighten the sensation of reality.

Note that the display device may be arranged so that not only is the speaker for outputting audio switched over, but the output position of the audio can be pseudo-controlled with the audio processing. Thus, the display device can provide the user a feeling that the audio is output from an arbitrary position without restriction on the placement location or number of speakers for the audio output positions.

Also, by controlling the audio output timing (delay amount) for each speaker according to the position of the user viewing/listening to the content as to the display device, the output position can be virtually changed (the audio output position sensed by the user can be changed).

FIG. 19 is a block diagram showing a configuration example of the display device in such a case. In FIG. 19, the display device 200 has a user position corresponding processing unit 201, in addition to the configuration of the display device 10. Remote commander position information which is supplied along with user instruction commands from the remote commander via the user instruction receiver 42, serving as output information of a position sensor provided on the remote commander, is supplied on the user position corresponding processing unit 201.

The user position corresponding processing unit 201 detects a position serving as a basis for the display device 200 of the remote commander based on the position information of the user position corresponding processing unit 201, and this is arranged as the user position. Then the user position corresponding processing unit 201 calculates the delay amount of the audio output for each speaker, based on the user position, and upon delaying the audio data supplied from the audio output position control unit 37 only the amount of the delay, the audio data is supplied to the audio output unit 39 and the audio is output. In other words, the user position corresponding processing unit 201 delays the audio output based on the user position (the corresponding position of the user from the display device).

Figure 20:
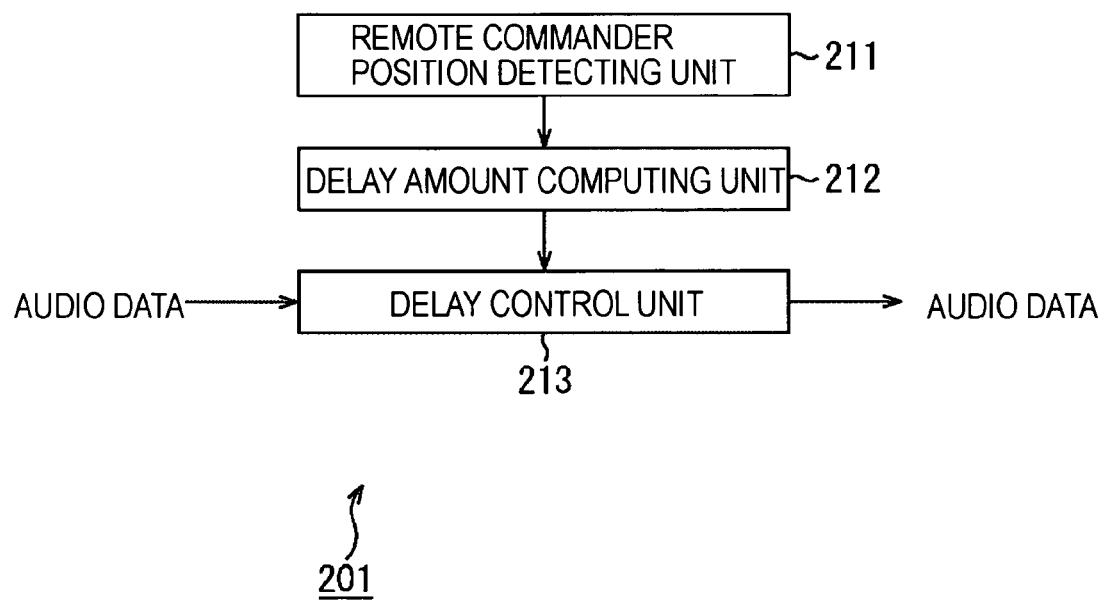
FIG. 20 is a block diagram illustrating a detailed configuration example of a user position corresponding processing unit in FIG. 19.

FIG. 20 is a block diagram showing a detailed configuration example of the user position corresponding processing unit 201. In FIG. 20, the user position corresponding processing unit 201 has a remote commander position detecting unit 211, delay amount computing unit 212, and delay amount control unit 213.

The remote commander position detecting unit 211 detects the position of the remote commander as the user position based on the output information of the position sensor supplied from the remote commander, and supplies this information to the delay amount computing unit 212. The delay amount computing unit 212 computes the delay amount of the audio output for each speaker based on the information of the user position supplied from the remote commander position detecting unit 211, and supplies this to the delay control unit 213. The delay control unit 213 supplies the output timing of the audio data for each speaker which is supplied from the audio output position control unit 37, to the audio output unit 39, after delaying only the amount of the delay amount, and outputs the audio.

Figure 21:
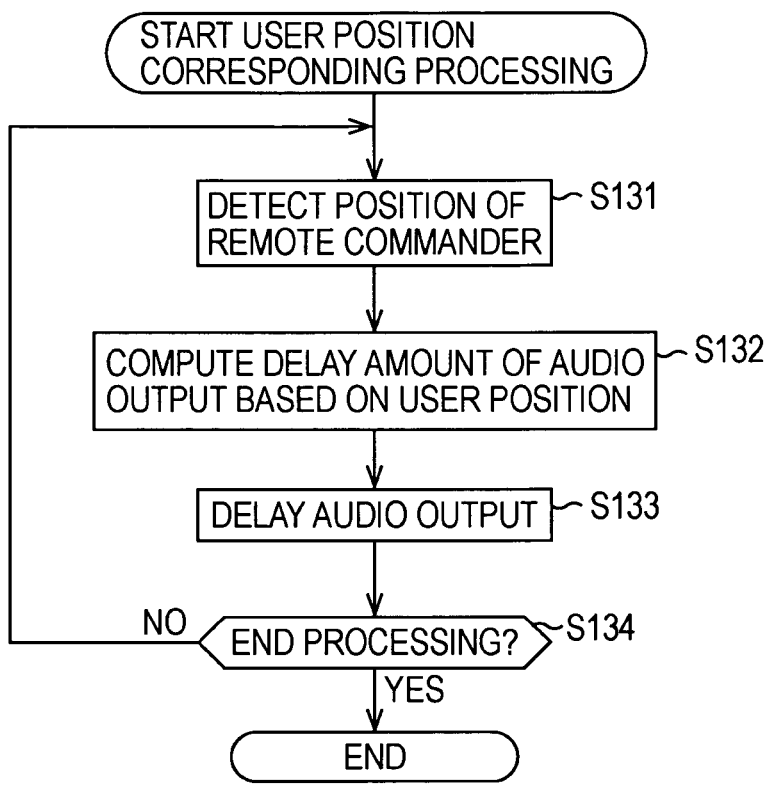
FIG. 21 is a flowchart for describing an example of user position corresponding processing flow.

Next, as an example of the specific processing flow, an example of the flow of user position corresponding processing which is executed by the user position corresponding processing unit 201 will be described with reference to the flowchart in FIG. 21.

In step S131, the remote commander position detecting unit 211 detects the user position by detecting the position of the remote commander. In step S132, the delay amount computing unit 212 computes the delay amount of the audio output for each speaker based on the user position. In step S133, the delay control unit 213 delays the audio output for each speaker only the amount of the calculated delay amount. In step S134, the user position corresponding processing unit 201 determines whether or not to end the user position corresponding processing, and in the event that determination is made not to be ended, the processing is returned to step S131, and the processing thereafter is repeated. Also, in the event that determination is made in step S134 to end the user position corresponding processing, the user position corresponding processing unit 201 ends the user position corresponding processing.

Thus, by controlling the timing of the audio output based on the user position, the display device can output audio which can provide a strong feeling to the user that the audio is output from the positions corresponding to the display image, and heighten the sensation of reality.

Figure 22:
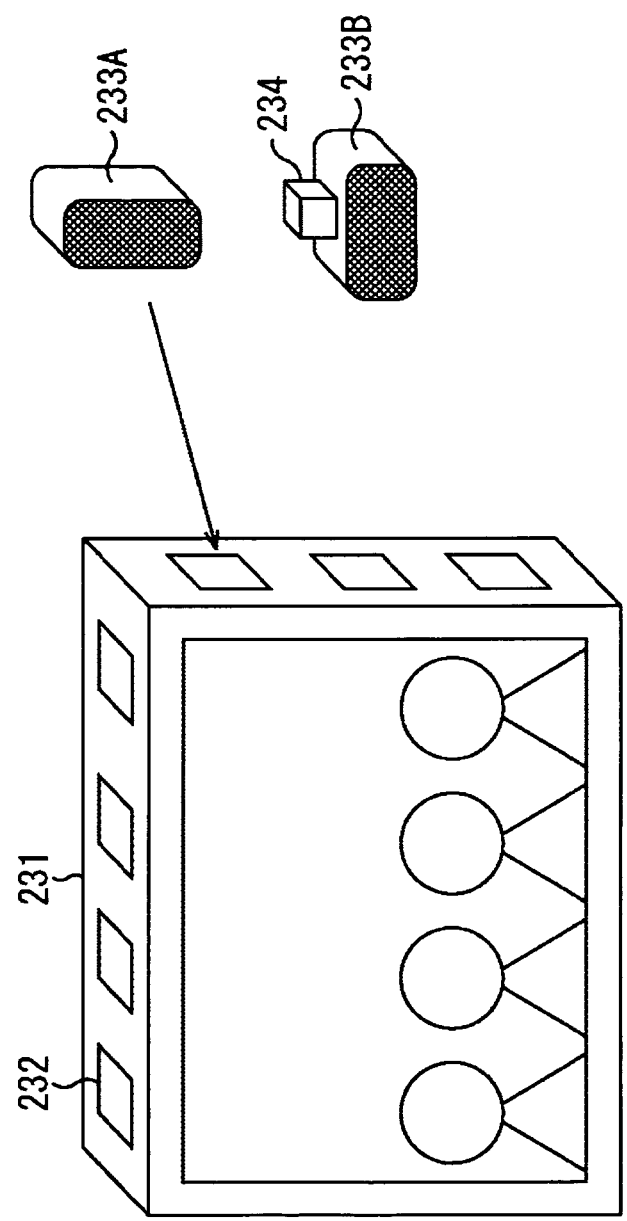
FIG. 22 is diagram illustrating an external view of yet another configuration example of the display device.

Also, the speakers of the display device may be arranged to be detachable from the display device. FIG. 22 is a perspective view showing an example of the display device with detachable speakers.

In FIG. 22, the display device 231 has multiple recessed portions on the four side of upper, lower, left, and right, when the image display screen is facing the front, formed for attaching speakers. The speakers 233A and 233B are speakers which are detachable from the display device 231. When there is no need to describe the speakers 233A and 233B separate from one another, these will be denoted as speaker 233. A protruding portion 234 is provided on the speaker 233, as shown on speaker 233B. This protruding portion 234 corresponds to the recessed portion 232 of the display device 231, and the speaker 233 can be attached to the display device 231 so as to fit the protruding portion 234 with the recessed portion of the display device 231, thereby fixing the speaker 233 to the side face of the display device 231.

Also, the user can separate the speaker 233 from the display device 231 by pulling the speaker 233, which is fixed to the display device 231, so as to separate from the display device 231.

Note that the recessed portion 232 and the protruding portion 234 each have an electrode at a position corresponding each thereto, and in a state whereby the speaker 233 is fixed to the display device 231, an internal circuit of the display device 231 and the speaker 233 are electrically connected, and the audio signal output by the display device 231 is obtained by the speaker 233, and audio corresponding to the audio signal thereof can be output.

Further, the multiple recessed portions 232 provided on the display device 231 are each of the same shape, and the speaker 233 is attachable to any recessed portion 232. In other words, the number of speakers 233 the same as the number of recessed portions 232 can be attached to the display device 231.

Figure 23:
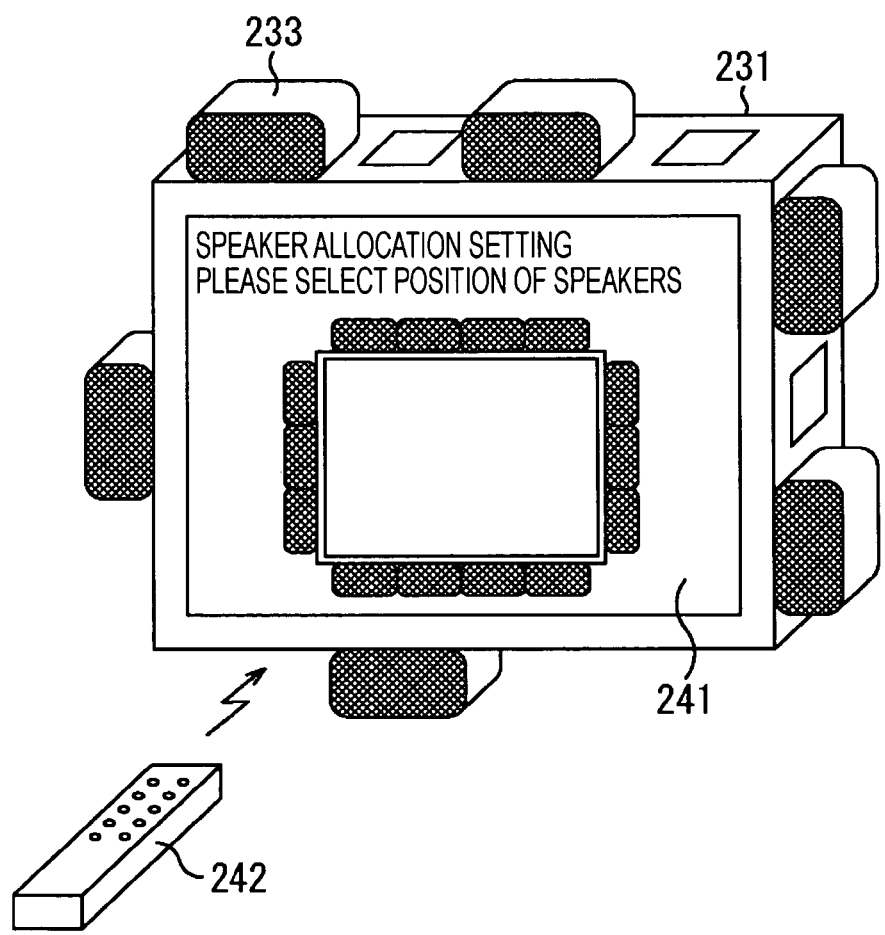
FIG. 23 is a model diagram illustrating a display example of an input guide image.

Also, the display device 231 displays a menu screen for guiding input of speaker positioning setting, as shown in FIG. 23. The display device 231 shown in FIG. 23 has an input guide image 241 displayed. The user inputs speaker positioning of actual setup of speakers, or selecting the closest pattern of actual placement to prepared patterns, according to the input guide image 241. The display device 231 determines a dividing method for regions of the display image based on the input information relating to the placement of the speakers, stores the settings thereof, and uses the settings for the audio output position control.

Figure 24:
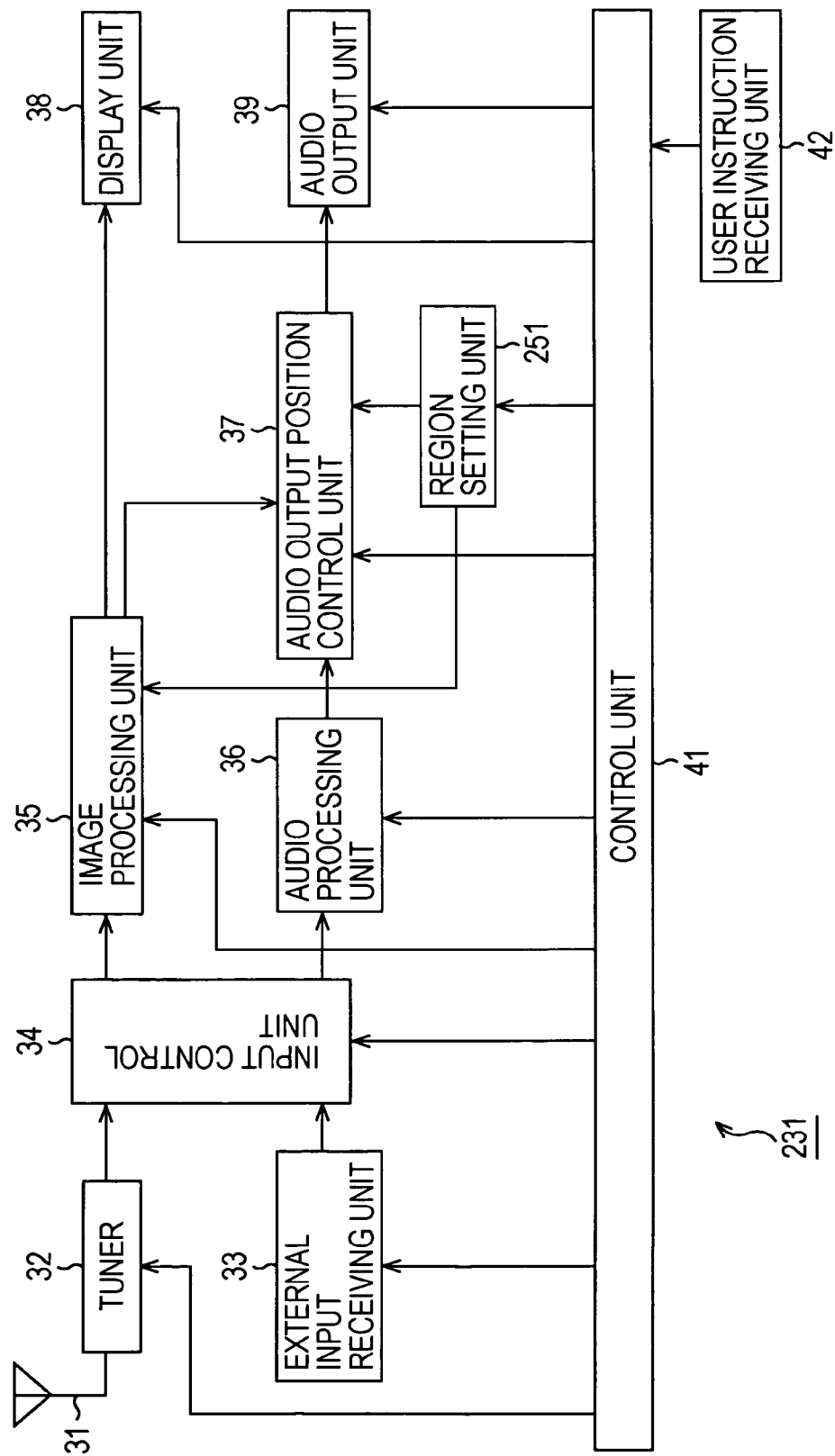
FIG. 24 is a block diagram illustrating yet another configuration example of the display device.

FIG. 24 is a block diagram showing an internal configuration example of the display device 231 in such a case. In FIG. 24, the display device 231 has basically the same configuration as the display device 10, but also has a region setting unit 251 in addition to the configuration of the display device 10.

The region setting unit 251 supplies image data of the input guide image 241 to the image processing unit 35, and displays this on the display unit 38. The user operates the remote commander based on the input guide image 241 and inputs the information relating to the speaker positioning. Upon the user instruction receiver 42 obtaining the user instructions, supplies this to the region setting unit 251. The region setting unit 251 performs region settings based on the information relating to speaker positioning which is input by the user, and this setting information is supplied to the audio output position control unit 37. The audio output position control unit 37 divides the display image based on the settings thereof into multiple regions corresponding to the speaker positioning.

Figure 25:
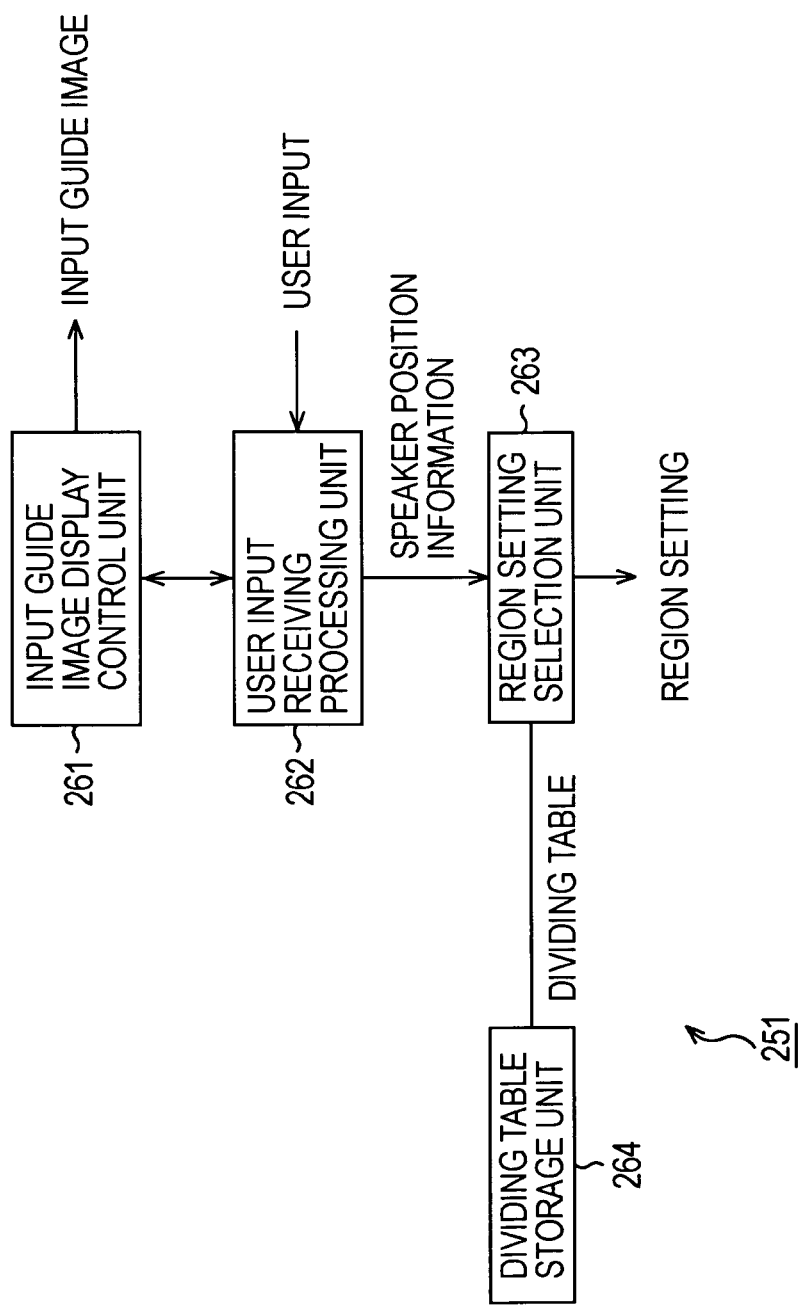
FIG. 25 is a block diagram illustrating a detailed configuration example of a region setting unit in FIG. 24.

FIG. 25 is a block diagram showing a detailed configuration example of the region setting unit 251. In FIG. 25, the region setting unit 251 has an input guide image display control unit 261, user input receiving processing unit 262, region setting selecting unit 263, and dividing table storage unit 264.

The input guide image display control unit 261 supplies the input guide image 241 to the image processing unit 35. Upon the user input receiving processing unit 262 obtaining the user input which is input according to the input guide image 241 via the user instruction receiving unit 42, the speaker position information serving as information relating to the speaker positioning is extracted from the user input thereof, and supplies this to the region setting selecting unit 263. The region setting selecting unit 263 selects a division pattern of regions corresponding to the supplied speaker position information, based on the dividing table associating the speaker positioning pattern and the region division pattern which is stored in the dividing table storage unit 264, and supplies this to the audio output position control unit 37 as the region setting.

Figure 26:
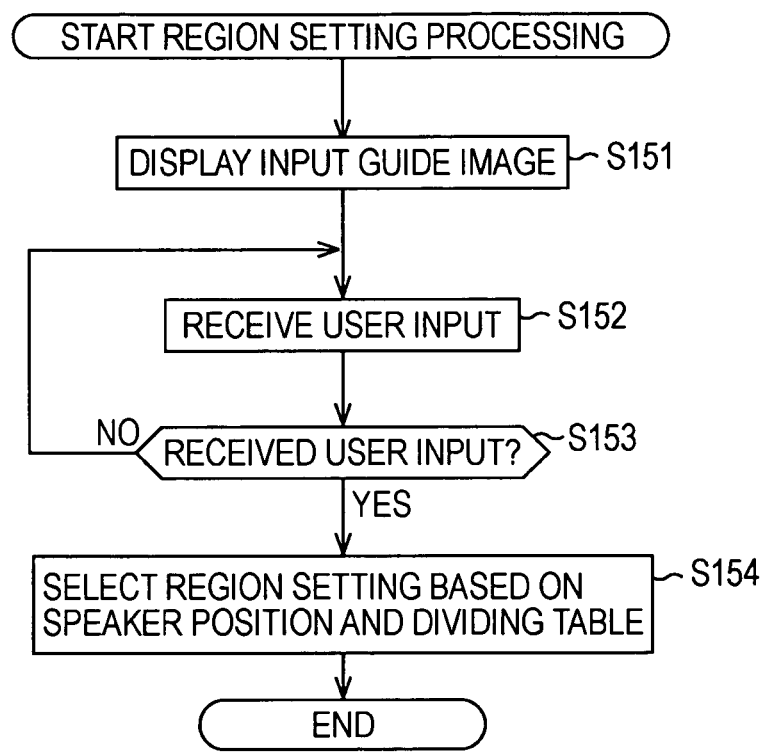
FIG. 26 is a flowchart for describing an example of region setting processing flow.

An example of specific processing flow of the region setting processing executed by the region setting unit 251 will be described with reference to the flowchart in FIG. 26.

In step S151 the input guide image display control unit 261 displays the input guide image 241 in the display unit 38. In step S251, the user input receiving processing unit 262 receives user input. The user input receiving processing unit 262 determines whether or not the user has received input, and the flow is returned to step S152 and the processing thereafter repeatedly executed until determination is made that input has been received. Upon determining that the user input has been received in step S153, the user input receiving processing unit 262 advances the processing to step S154. In step S154, the region setting selecting unit 263 selects the most appropriate region settings based on the speaker positions and the dividing table. Upon the processing in step S154 ending, the region setting unit 251 ends the region setting processing.

By setting the regions as above, even with an arbitrary number of speakers allocated in arbitrary positions, the display device can output the audio corresponding to the displayed image so as to heighten the sensation of reality.

Note that by confirming the connection status of speaker connection terminals which are provided on each of the recessed portions 232 on the display device 231, the display device 231 can grasp the placement of the speaker 233 automatically without user input as shown in FIG. 23.

Figure 27:
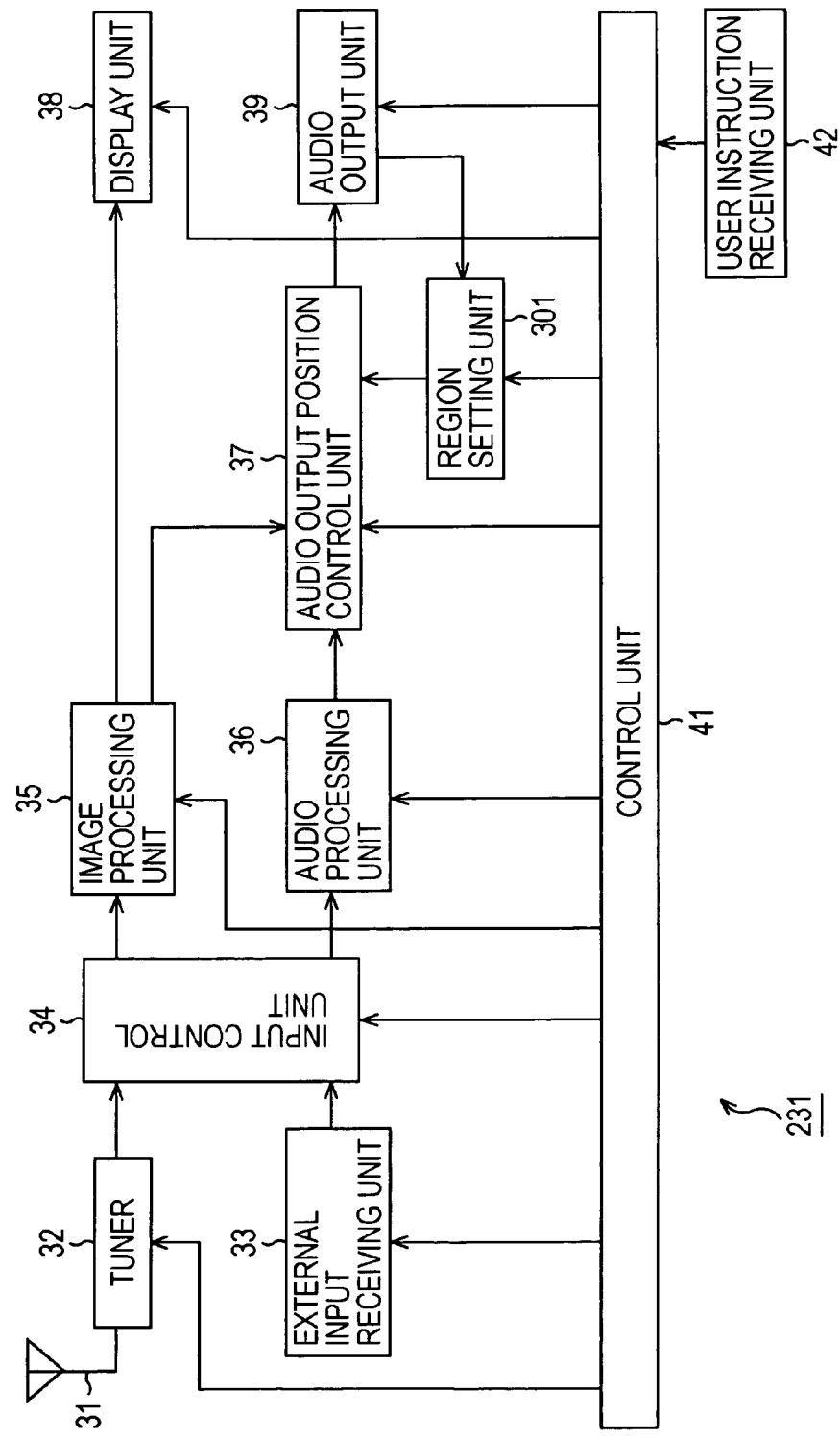
FIG. 27 is a block diagram illustrating yet another configuration example of the display device.

FIG. 27 is a block diagram showing an internal configuration example of such a display device 231. In FIG. 27, the display device 231 has a configuration basically similar to the display device 10, but also has a region setting unit 301 in addition to the configuration of the display device 10.

The region setting unit 301 obtains connection information indicating that the speaker 233 has been connected from the audio output unit 39. For example, the region setting unit 301 sends a predetermined signal to the speaker connection terminal provided on each recessed unit 232, or measures the voltage of the speaker connection terminal, and thus confirms the connection status of the speaker based on response signals or voltage and so forth. Then the region setting unit 301 performs region setting based on the detected speaker positioning, and supplies this region setting information to the audio output position control unit 37. The audio output position control unit 37 divides the display image into multiple regions corresponding to speaker positioning, based on the settings performed.

Figure 28:
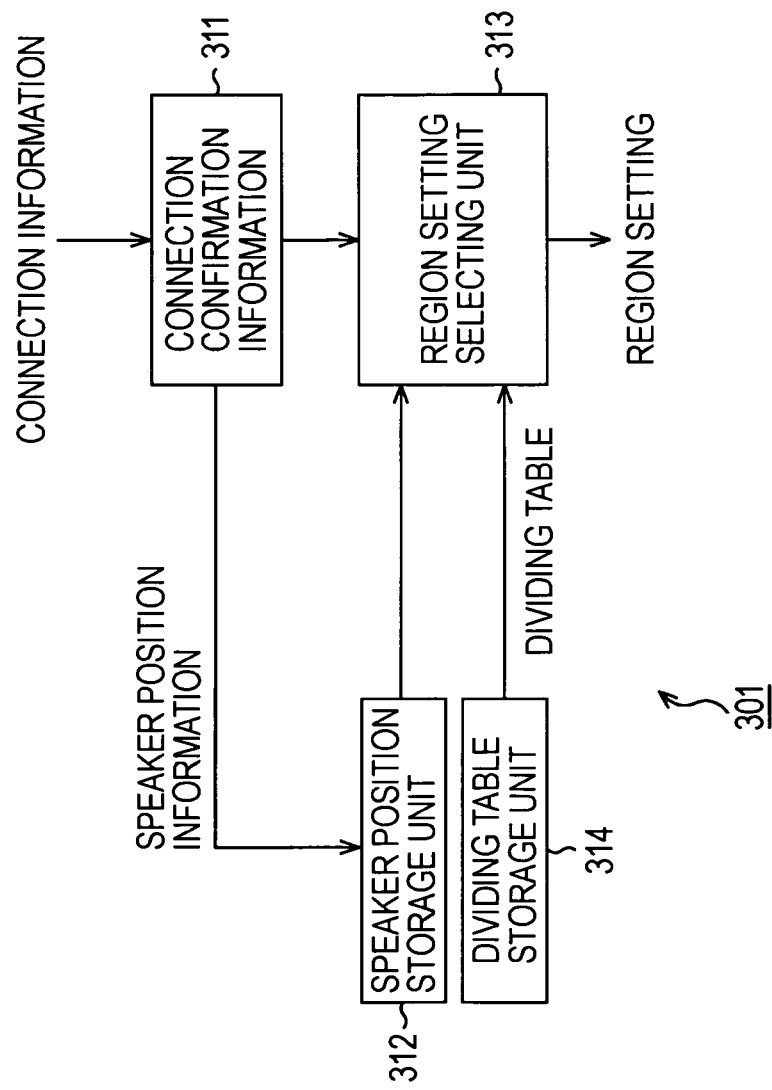
FIG. 28 is a block diagram illustrating a detailed configuration example of a region setting unit in FIG. 27.

FIG. 28 is a block diagram showing a detailed configuration example of the region setting unit 301. In FIG. 28, the region setting unit 301 has a connection confirming unit 311, speaker position storage unit 312, region setting selecting unit 313, and dividing table storage unit 314.

The connection confirming unit 311 obtains connection information from each speaker connection terminal, and confirms the connection state of the speakers. Then upon detecting the speaker, the connection confirming unit 311 supplies the speaker position information indicating the position thereof to the speaker position storage unit 312. The speaker position storage unit 312 stores all of the detected speaker positions, and supplies the position information thereof to the region setting selecting unit 313 as needed.

Upon confirming that the connection confirming unit 311 is connected with all of the speaker connection terminals, the region setting selecting unit 313 obtains speaker position information indicating the position of detected speakers, and obtains a dividing table associating a speaker positioning pattern and a region division pattern from the dividing table storage unit 314. The region setting selecting unit 313 uses this dividing table to select the division pattern corresponding to the placement of speakers, and supplies this to the audio output position control unit 37 as a region setting.

Figure 29:
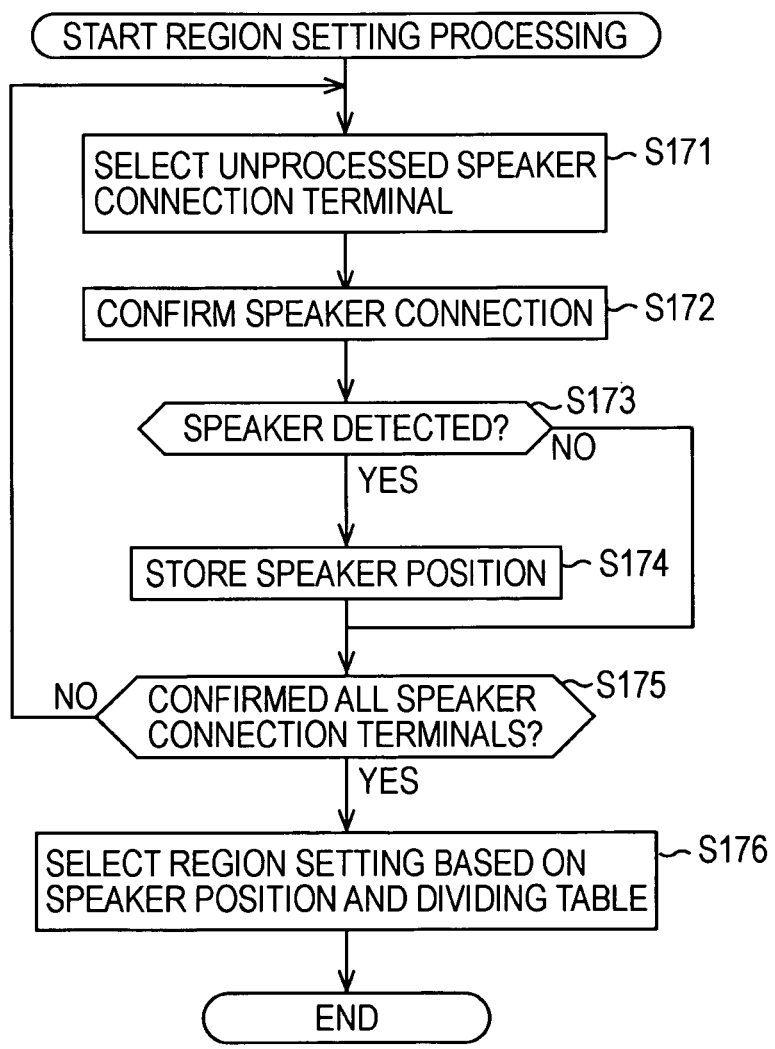
FIG. 29 is a flowchart for describing another example of the region setting processing flow.

A specific processing flow of the region setting processing which is executed by the region setting unit 301 will be described with reference to the flowchart in FIG. 29.

In step S171, the connection confirming unit 311 selects an unprocessed speaker terminal. In step S172, the connection confirming unit 311 confirms speaker connection with the selected speaker connection terminal. In step S173, the connection confirming unit 311 determines whether or not a speaker has been detected, and in the event that determination is made that the speaker is detected, the processing is advanced to step S174. In step S174, the speaker position storage unit 312 stores the position of the detected speaker, and advances the processing to step S175. Also, in the event that determination is made in step S173 that a speaker is not detected, the connection confirming unit 311 skips the processing in step S174, and advances the processing to step S175. In step S175, the connection confirming unit 311 determines whether or not all of the speaker connection terminals have been confirmed, and in the event that determination is made that there are unprocessed speaker connection terminals, the processing is returned to step S171, and the processing thereafter is repeated. Also, in the event that determination is made in step S175 that all of the connection terminals have been confirmed, the connection confirming unit 311 advances the processing to step S176. In step S176, the region setting selecting unit 313 selects a region setting based on the speaker position and the dividing table, and upon supplying this to the audio output position control unit 37, ends the region setting processing.

With the display device detecting the speaker and setting the region as above, the user can perform region settings more easily. In other words, the display device can output the audio corresponding to the displayed image with a greater sensation of reality, without necessitating complicated work.

Note that in order to detect the connected speaker, a sensor or switch may be provided to detect that the speaker 233 is connected to each of the recessed portions 232 of the display device 231. In this case, the region setting unit 301 obtains the output information from such sensor or switch, and detects the speaker.

The above-described series of processing can be executed with hardware, or can be executed with software. In this case, for example, the audio output position control unit 37, user position corresponding processing unit 201, region setting unit 251, or region setting unit 301 may be configured as a personal computer, such as that shown in FIG. 30.

In FIG. 30, the CPU (Central Processing Unit) of a personal computer 400 executes various processing according to a program stored in ROM (Read Only Memory) 402, or a program loaded to RAM (Random Access Memory) from the storage unit 413. The RAM 403 also may have necessary data stored thereupon for the CPU 401 to execute various processing.

The CPU 401, ROM 402, and RAM 403 are mutually connected via a bus 404. This bus 404 is also connected to an input/output interface 410.

The input/output interface 410 is also connected to an input unit 411 such as a keyboard, mouse, or the like, a display such as a CRT (Cathode Ray Tube), LCD (Liquid Crystal Display) or the like, and an output unit 412 such as a speaker, a storage unit configured with a hard disk or the like, and a communication unit 414 configured with a modem or the like. The communication unit 414 performs communication processing via a network including the Internet.

The input/output interface 410 is also connected to a drive 415 as needed, removable media 421 such as a magnetic disk, optical disk, optical-magnetic disk, semiconductor memory, or the like are mounted as appropriate, and the computer program read out from these is installed in the storage unit 413 as needed.

In the case of executing the above-described series of processing with software, the program configuring the software is installed from a network or storage medium.

The storage medium is not restricted to being configured of removable media such as a magnetic disk (including a flexible disk), optical disk (including a CD-ROM (Compact Disk-Read Only Memory) or DVD (Digital Versatile Disk)), optical-magnetic disk (including a MD (Mini-Disk) (registered trademark)), or semi-conductor memory, distributed separately from the device main unit for the purpose of distributing the program to the user, as shown in FIG. 30, rather, the storage medium also may be configured of a hard disk included in a ROM 402 or storage unit 413 in which the program is recorded, so as to be distributed to the user already built into the device main unit.

Note that with the present specification, the steps described in the program recorded on a recording medium include processing performed in a time sequence in the described order as a matter of course, but also include processing executed not necessarily in the time sequence but rather in parallel or individually.

Also, with the present specification, the term "system" refers to the entirety of equipment configured of multiple devices.

It should be understood by those skilled in the art that various modifications, combinations, sub-combinations and alterations may occur depending on design requirements and other factors insofar as they are within the scope of the appended claims or the equivalents thereof.

What is claimed is:

1. An image display device for displaying images, comprising:

image display means for displaying images;

audio output means for outputting audio comprising a plurality of channels from one or more of multiple positions corresponding to the images displayed with the image display means;

audio output position control means for analyzing the images, controlling the audio output means according to content of the images, and selecting a position from which to output audio;

screen region dividing means for dividing a display screen of the image display means into a predetermined plurality of regions;

difference average value calculating means for calculating a difference average value which is an average value of difference values of a luminance value between frames for each pixel having predetermined features wherein a pixel value thereof is determined in advance, for each region divided by the screen region dividing means; and audio output control means for controlling the audio output means and selecting the position for outputting the audio, based on the difference average values calculated with the difference average value calculating means and based on a volume difference between a volume of a first channel in the plurality of channels and a volume of a second channel in the plurality of channels.

2. The image display device according to claim 1, wherein the audio output means further comprises a plurality of speakers;

and wherein the audio output position control means controls the audio output means to select a speaker from the plurality of speakers from which to output the audio.

3. The image display device according to claim 1, wherein the audio output means are capable of controlling an audio output position virtually by controlling output timing of the audio;

and wherein the audio output position control means control the audio output means to select the output timing, thus controlling a virtual position from which to output the audio.

4. The image display device according to claim 1, the audio output position control means further comprising:

volume confirming means for confirming a volume of the plurality of channels to specify the audio output positions;

difference average value correcting means for correcting the difference average value calculated by the difference average value calculating means, based on the audio output positions specified by the volume confirming means; and region specifying means for specifying a region for outputting the audio, based on the difference average value corrected by the difference average value correcting means, wherein the audio output control means controls the audio output means so as to output the audio from a position corresponding to the region specified by the region specifying means.

5. The image display device according to claim 1, the audio output position control means further comprising:

region specifying means for specifying a region for the audio to be output, based on the difference average value calculated by the difference average value calculating means;

volume adjusting means for determining an adjustment amount of a volume of the audio output from the audio output means, based on the region specified by the region specifying means;

volume confirming means for confirming a volume of the plurality of channels to specify the audio output positions;

comparing means for comparing the region specified by the region specifying means and the audio output positions specified by the volume confirming means; and adjustment amount correcting means for correcting the amount of adjustment for audio volume determined by the volume adjusting means, based on the comparison results by the comparing means;

wherein, the audio output control means controls the audio output means so as to adjust the audio volume based on the volume adjustment amount corrected by the adjustment amount correcting means.

6. The image display device according to claim 1, further comprising user position corresponding processing means for detecting a position of a user viewing/listening to the images and audio, and controlling a delay amount of audio output timing by the audio output means, according to the position of the user.

7. The image display device according to claim 1, wherein the audio output means has a plurality of detachable speakers; and wherein the image display device further comprises region setting means for setting the regions to be divided by the screen region dividing means, according to positions of the speakers connected thereto.

8. The image display device according to claim 1, wherein the audio output means has a plurality of speakers, and a location of each of the plurality of speakers corresponds to one of the plurality of regions.

9. The image display device according to claim 8, wherein the plurality of speakers includes at least three speakers located along a single side of the display screen perimeter.

10. The image display device according to claim 8, wherein the plurality of speakers includes a plurality of speakers located on each side of the display screen perimeter.

11. The image display device according to claim 8, wherein the plurality of regions is divided into a grid, and each section of the grid corresponds to a pair of speakers which include one speaker on a first side of the display screen perimeter and another speaker on a second side of the display screen perimeter.

12. The image display device according to claim 1, wherein the audio output control means determines if the calculated difference average values are at or below a threshold in all of the plurality of regions, and when the difference average values are not at or below the threshold in all the regions, the audio output control means selects the position corresponding to the region having the greatest difference average value to output audio, and when the difference average values are at or below the threshold in all the regions, the audio output control means outputs audio from all of the positions.

13. An image display method for displaying an image on an image display device, comprising the steps of:

displaying an image having image content associated with a plurality of audio channels;

analyzing the image to be displayed, and selecting a position of audio output corresponding to the image, according to the image content and the plurality of audio channels;

dividing a display screen on which the image is displayed into a predetermined plurality of regions;

calculating a difference average value which is an average value of the difference values of the luminance value between frames for each pixel having predetermined features wherein a pixel value thereof is determined in advance, for each of the plurality of regions divided on the display screen; and selecting the position of audio output corresponding to the image, according to the calculated difference average value in the calculating and a volume difference between a volume of a first channel in the plurality of channels and a volume of a second channel in the plurality of channels.

14. The method according to claim 13, further comprising:

determining if the calculated difference average values are at or below a threshold in all of the plurality of regions; and when the difference average values are not at or below the threshold in all the regions, selecting the position corresponding to the region having the greatest difference average value to output audio, and when the difference average values are at or below the threshold in all the regions, outputting audio from all of the positions.

15. A computer readable storage medium including computer executable instructions, wherein the instructions, when executed by a computer, cause the computer to perform a method comprising:

displaying an image having image content associated with a plurality of audio channels;

analyzing the image to be displayed, and selecting a position of audio output corresponding to the image, according to the image content and the plurality of audio channels;

dividing a display screen on which the image is displayed into a predetermined plurality of regions;

calculating a difference average value which is an average value of the difference values of the luminance value between frames for each pixel having predetermined features wherein a pixel value thereof is determined in advance, for each of the plurality of regions divided on the display screen; and selecting the position of audio output corresponding to the image, according to the calculated difference average value in the calculating and a volume difference between a volume of a first channel in the plurality of channels and a volume of a second channel in the plurality of channels.

16. An image display device for displaying images, comprising:

an image display unit configured to display images;

an audio output unit configured to output audio comprising a plurality of channels from one or more multiple positions corresponding to the images displayed with the image display unit;

an audio output position control unit configured to analyze the images, controlling the audio output unit according to content of the images, and selecting a position from which to output audio;

a screen region dividing unit configured to divide a display screen of the image display unit into a predetermined plurality of regions;

a difference average value calculating unit configured to calculate a difference average value which is an average value of the difference values of a luminance value between frames for each pixel having predetermined features wherein a pixel value thereof is determined in advance, for each region divided by the screen region dividing unit;

an audio output control unit configured to control the audio output unit and select the position for outputting the audio, based on the difference average values calculated with the difference average value calculating unit and based on a volume difference between a volume of a first channel in the plurality of channels and a volume of a second channel in the plurality of channels.

17. The image display device according to claim 16, wherein the audio control unit is further configured to determine if the calculated difference average values are at or below a threshold in all of the plurality of regions, and when the difference average values are not at or below the threshold in all the regions, the audio output control unit selects the position corresponding to the region having the greatest difference average value to output audio, and when the difference average values are at or below the threshold in all the regions, the audio output control unit outputs audio from all of the positions.

* * * * *